(12) United States Patent
Naoi et al.

(10) Patent No.: US 9,522,703 B2
(45) Date of Patent: Dec. 20, 2016

(54) WINDSHIELD GLASS SUPPORT STRUCTURE

(71) Applicant: HONDA MOTOR CO., LTD., Minato-Ku, Tokyo (JP)

(72) Inventors: Daisuke Naoi, Wako (JP); Masato Sasaki, Wako (JP); Hidefumi Nihei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 14/433,184

(22) PCT Filed: Oct. 3, 2013

(86) PCT No.: PCT/JP2013/076955
§ 371 (c)(1),
(2) Date: Apr. 2, 2015

(87) PCT Pub. No.: WO2014/054739
PCT Pub. Date: Apr. 10, 2014

(65) Prior Publication Data
US 2015/0232128 A1  Aug. 20, 2015

(30) Foreign Application Priority Data

Oct. 4, 2012 (JP) .................................. 2012-222063
Apr. 18, 2013 (JP) .................................. 2013-087125

(51) Int. Cl.
*B60J 1/00* (2006.01)
*B62D 25/14* (2006.01)
*B62D 25/08* (2006.01)

(52) U.S. Cl.
CPC ........... *B62D 25/145* (2013.01); *B62D 25/081* (2013.01)

(58) Field of Classification Search
CPC ............................. B62D 25/145; B62D 25/081
See application file for complete search history.

(56) References Cited

U.S. PATENT DOCUMENTS 8,414,057 B2  4/2013  Yamagishi
2015/0015030 A1  1/2015  Sasaki et al.

FOREIGN PATENT DOCUMENTS

| JP | 2001-018849 A | 1/2001 |
| JP | 2003-191750 A | 7/2003 |
| JP | 2007-320453 A | 12/2007 |
| JP | 2010-047076 A | 3/2010 |
| JP | 2012006537 A | 1/2012 |

*Primary Examiner* — Lori L Lyjak
(74) *Attorney, Agent, or Firm* — Carrier Blackman & Associates, P.C.; Joseph P. Carrier; Fulchand P. Shende

(57) ABSTRACT

A windshield glass support structure is provided that is capable of absorbing an impact load caused by external force even if the external force is applied at any angle to an outer surface of the windshield glass. The windshield glass support structure includes a windshield support panel that extends toward a lower end of the windshield glass from a cross member, and a glass support member that inclines rearward in the vehicle front-rear direction and upward in the vehicle up-down direction from a front edge of the windshield support panel along a lower side surface of the windshield glass. The glass support member is arranged to be deformable when external force is applied in any direction from a front in the vehicle front-rear direction.

13 Claims, 24 Drawing Sheets

WINDSHIELD GLASS SUPPORT STRUCTURE

TECHNICAL FIELD

The present invention relates to a windshield glass support structure which supports a windshield glass provided in a vehicle such as a car.

BACKGROUND ART

For example, Patent Document 1 discloses a windshield glass support structure 4 including a windshield support panel 3 which extends from a rigid cowl reinforcement 1 of a closed section toward a lower edge part of a windshield glass 2 (see FIG. 24). The windshield support panel 3 is arranged to incline upward toward an upper front side of the vehicle so as to make a separation angle with the windshield glass 2 be an acute angle.

In Patent Document 1, in a case where external force is applied from a diagonally upper front side to a lower part of the windshield glass 2, the windshield support panel 3 deforms easily toward a lower front side of the vehicle (see a two-dot chain line in FIG. 24).

PRIOR ART DOCUMENT

Patent Document

Patent Document 1: Japanese Patent No. 3711930 B

SUMMARY OF THE INVENTION

Problems to be Solved by the Invention

However, in the windshield glass support structure 4 disclosed in Patent Document 1, as shown in FIG. 24, in a case where the external force F is applied from a diagonally front direction which is the same direction as a surface of the windshield support panel 3 (in a case where the external force F is applied such that the external force F is coaxial with an axis line of the windshield support panel 3), reaction force R is generated in the windshield support panel 3 supported by the rigid cowl reinforcement 1 of the closed section.

Therefore, in the windshield glass support structure disclosed in Patent Document 1, the external force F and the reaction force R face oppositely to cancel out with each other, making it difficult for the windshield support panel 3 to deform toward the lower front side of the vehicle. Consequently, the windshield glass support structure 4 disclosed in Patent Document 1 may not be able to absorb an impact load caused by the external force F depending on an applying angle of the external force F.

The present invention has been made in view of the above problem and aims to provide a windshield glass support structure which can absorb an impact load caused by external force even when the external force is applied at any angle to an outer surface of a windshield glass.

Means to Solve the Problems

To solve the above problem, the present invention provides a windshield glass support structure including: a windshield support panel that extends from a cross member toward a lower end of a windshield glass; and a glass support member that inclines rearward in a vehicle front-rear direction and upward in a vehicle up-down direction from a front edge of the windshield support panel along a lower side surface of the windshield glass, wherein the glass support member is arranged to be deformable when external force is applied to an outer surface of the windshield glass.

According to the present invention, the glass support member is arranged to incline from the front edge of the windshield support panel rearward in a vehicle front-rear direction and upward in a vehicle up-down direction along the lower side surface of the windshield glass. Therefore, for example, if the external force is applied at any angle to the outer surface at the lower end part of the windshield glass, the glass support member is deformed against the external force to absorb the impact load caused by the external force.

In other words, in the present invention, generation of reaction force can be preferably avoided that oppositely faces the external force to cancel out with each other. Therefore, even if the external force is applied at any angle from a front in the vehicle front-rear direction, the impact load caused by the external force can be absorbed.

Further, in the present invention, a plurality of ridgelines that extend in a vehicle width direction are formed in the windshield support panel.

According to the present invention, the windshield support panel has the plurality of ridgelines extending in the vehicle width direction. This can enhance rigidity of the windshield support panel, improve support rigidity at the lower end part of the windshield glass, and decrease vibration of the windshield glass.

In this case, since a base part of the windshield support panel is supported by a cross member having relatively high rigidity, the support rigidity of the windshield glass can be further improved at the lower end part.

Further, in the present invention, raised parts are arranged at both end parts of the windshield support panel along the vehicle width direction, respectively, and the plurality of ridgelines are formed between the raised parts arranged at both the end parts.

According to the present invention, the raised parts are respectively arranged at the right and left end parts of the windshield support panel and the plurality of ridgelines are continuously formed between the raised parts. This can enhance the rigidity of the windshield support panel, further improve the support rigidity at the lower end part of the windshield glass, and further decrease the vibration of the windshield.

Still further, in the present invention, both the end parts of the glass support member in the vehicle width direction are joined on upper surfaces of the raised parts, respectively.

According to the present invention, both the end parts of the glass support member in the vehicle width direction are joined on the upper surfaces of the raised parts. This can further enhance the support rigidity of the windshield glass at the lower end part and further decrease the vibration of the windshield glass.

Still further, in the present invention, the glass support member includes a drain that extends from the joining part with the windshield support panel toward a front of the vehicle.

According to the present invention, even if water (such as rain water or water at the time of car washing) leaks from a seal member interposed between an outer surface of the windshield glass at the lower end and the cowl top, the leaked water from the seal member can be discharged to an outside through the drain. Therefore, in the present invention, the leaked water can be preferably prevented from flowing into an engine compartment.

Still further, in the present invention, a cowl top is arranged in front of the windshield glass in the vehicle front-rear direction, and a front edge at a front side of the drain in the vehicle front-rear direction is closed by a partition wall of the cowl top.

According to the present invention, since the partition wall of the cowl top abuts on the front edge of the drain to close a space including the drain, a relatively large amount of water can be drained. In other words, the partition wall of the cowl top positioned higher than the drain at the front edge of the drain is arranged to allow capacity in the space including the drain to be increased to drain relatively large amount of water.

Still further, in the present invention, both the end parts of the drain in the vehicle width direction are connected to intake passages arranged at right and left sides of the vehicle.

According to the present invention, since both the end parts of the drain in the vehicle width direction are connected to the the right and left intake passages, the water can be drained to the outside through the intake passages, and a drain structure can be simplified.

Still further, in the present invention, the cowl top has a cowl raised part, damper base supports that form the intake passages are arranged on both end sides of the cowl raised part in the vehicle width direction, respectively, and the cowl top is supported by the damper base supports.

According to the present invention, both the end sides of the cowl raised part are supported by the damper base supports forming the intake passages. Therefore, for example, even if the cowl raised part is not supported from underneath by members on a vehicle body side, the cowl raised part generates substantial reaction force against the external force applied from diagonally above the cowl raised part to crash, allowing an impact load caused by external force to be absorbed.

Still further, in the present invention, the intake passages extend such that a height size of the intake passages in a vehicle up-down direction decreases frontward in the vehicle front-rear direction, and the intake passages are formed by the raised parts of the windshield support panel and the damper base support that extend frontward in the vehicle front-rear direction from the cross member and are arranged in the vehicle up-down direction, and the cowl top that is installed between the damper base supports and the windshield support panel.

According to the present invention, with such a structure, sufficient intake quantity can be secured, and for example, each member forming the intake passages can easily deform against the external force to absorb the impact load caused by the external force.

Still further, in the present invention, a reinforcement panel that continues to an upper wall of the cross member is arranged on the raised part of the windshield support panel.

According to the present invention, since the right and left raised parts of the windshield support panel has the reinforcement panels which continue to an upper flange of the cross member, a closed section of the cross member can be extended approximately up to a front pillar.

Still further, in the present invention, the windshield support panel includes a central part and a pair of right and left raised parts that extend from both end parts of the central part in the vehicle width direction, wherein a lower end part of the windshield glass is supported by the pair of right and left raised parts and the glass support member, the central part and the glass support member form a first dogleg-shaped cross section in side view, wiper drive devices that drive wipers are accommodated under the raised parts, and a fragile part is formed on a central side in the vehicle width direction with respect to the wiper drive devices in planar view of the raised parts.

According to the present invention, the glass support member is arranged so as to form a dogleg shape with the central part of the wind shield support panel. This allows, for example, the glass support member to be deformed by the external force applied at any angle to the outer surface of the lower end part of the windshield glass to absorb the impact load caused by the external force.

In other words, in the present invention, generation of reaction force can be preferably avoided that oppositely faces the external force to cancel out with each other. Therefore, even if the external force is applied at any angle from a front in the vehicle front-rear direction, the impact load caused by the external force can be preferably absorbed.

Further, in the present invention, the fragile part is arranged on the central side in the vehicle width direction with respect to the wiper drive devices in planar view of the right and the left raised parts. This prevents the reaction force by the wiper drive devices 150 from being generated by the impact load reaching the wiper drive devices 150.

Still further, in the present invention, a reaction force generating member is included between the central part and the glass support member, and the reaction force generating member forms a second dogleg-shaped cross section in an opposite direction as the first dogleg-shaped cross section.

According to the present invention, the reaction force generating member is arranged between the central part and the glass support member. This allows the reaction force by the central part to be equalized at the time of deformation with the reaction force by the right and left raised parts to enhance absorption performance of the impact load.

Still further, in the present invention, the glass support member is joined on upper surfaces of the pair of right and left raised parts.

According to the present invention, both the end parts of the glass support member are joined in the vehicle width direction on the upper surfaces of the raised parts. This allows support rigidity to be further enhanced at the lower end part of the windshield glass and vibration of the windshield glass to be further decreased.

Still further, in the present invention, a fragile part is formed on the central side in the vehicle width direction with respect to a joining part with the raised part of the glass support member.

According to the present invention, since the fragile part is arranged in the glass support member, the glass support member deforms easily and absorption performance of the impact load can be further enhanced around the right and left raised parts.

Still further, in the present invention, the glass support member includes a drain that extends frontward in the vehicle front-rear direction from the joining part with the raised part.

According to the present invention, even if water (such as rain water or water at the time of car washing) leaks from a seal member which is interposed between the outer surface of the windshield glass at a lower end and the cowl top, the drain can discharge the leaked water from the seal member to an outside from side to side. This allows, in the present invention, the leaked water to be preferably prevented from flowing into an engine compartment.

Still further, in the present invention, a cowl top is arranged in front of the windshield glass in the vehicle front-rear direction, and a front edge at the front side of the drain in the vehicle front-rear direction is closed by a partition wall of the cowl top.

According to the present invention, since the partition wall of the cowl top abuts on the front edge of the drain to close a space including the drain, relatively large amount of water can be drained. In other words, the partition wall of the cowl top positioned higher than the drain is arranged at the front edge of the drain. This allows capacity in the space including the drain to be increased by the partition wall to drain relatively large amount of water.

Further, a front portion of a vehicle has a structure, according to the present invention, such that a plurality of ridgelines extending in the vehicle width direction are formed in the central part of the windshield support panel.

According to the present invention, since the windshield support panel has the plurality of ridgelines extending in the vehicle width direction, rigidity of the windshield support panel can be enhanced, support rigidity of the windshield glass can be improved at the lower end part, and vibration of the windshield glass can be decreased.

Effect of the Invention

The present invention can provide a windshield glass support structure that can absorb an impact load caused by external force even if the external force is applied at any angle to an outer surface of the windshield glass.

DETAILED DESCRIPTION OF THE INVENTION

Next, embodiments of the present invention will be described in detail with reference to the accompanying drawings. It is noted that "front-rear" and "up-down" indicate a front-rear direction and an up-down direction of a vehicle, while "right-left" indicates a right-left direction (vehicle width direction) seen from a driver's seat, respectively.

First Embodiment

Figure 1:
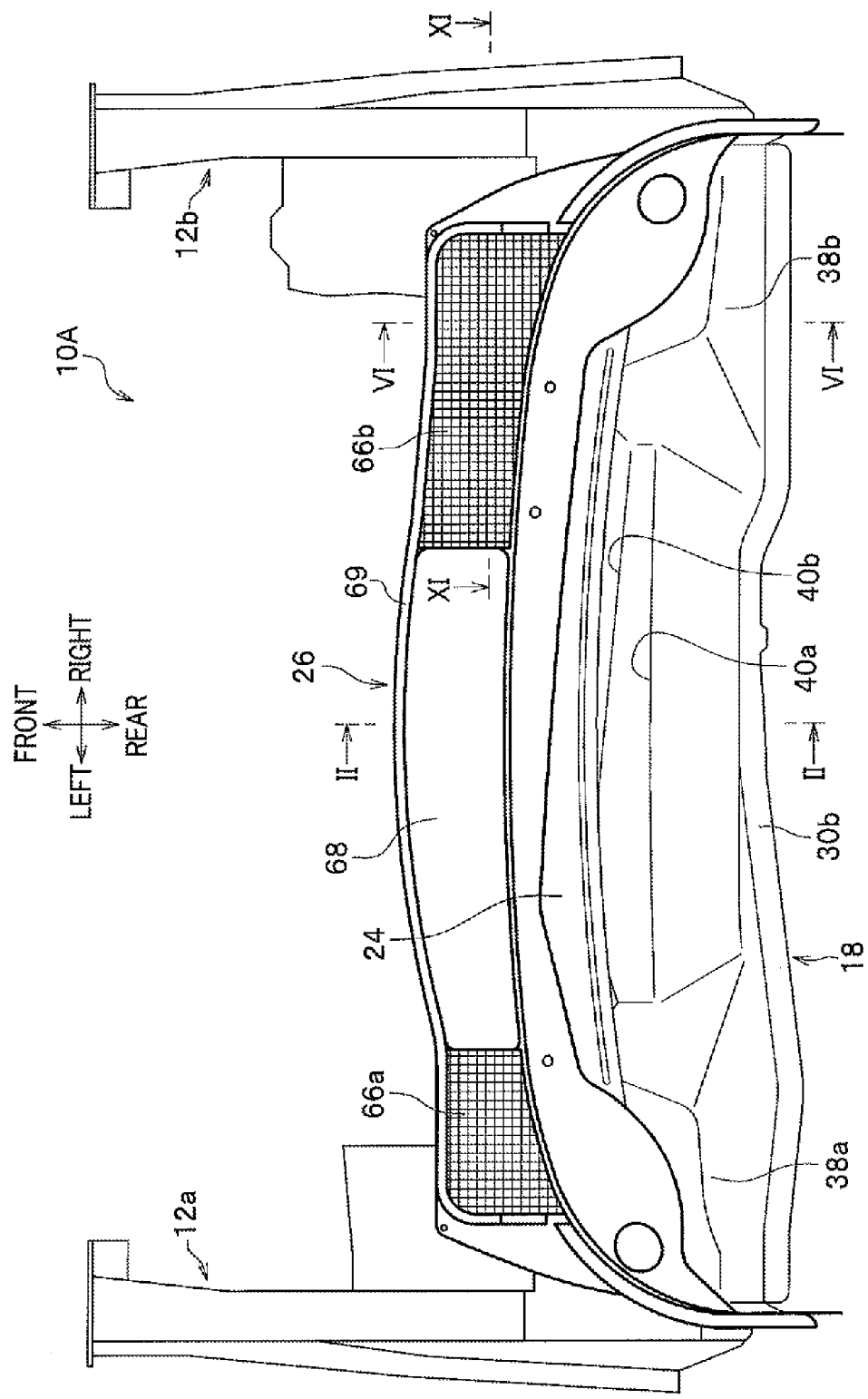
FIG. 1 is a partial plan view of a vehicle which is applied with a windshield glass support structure according to a first embodiment of the present invention.
Figure 2:
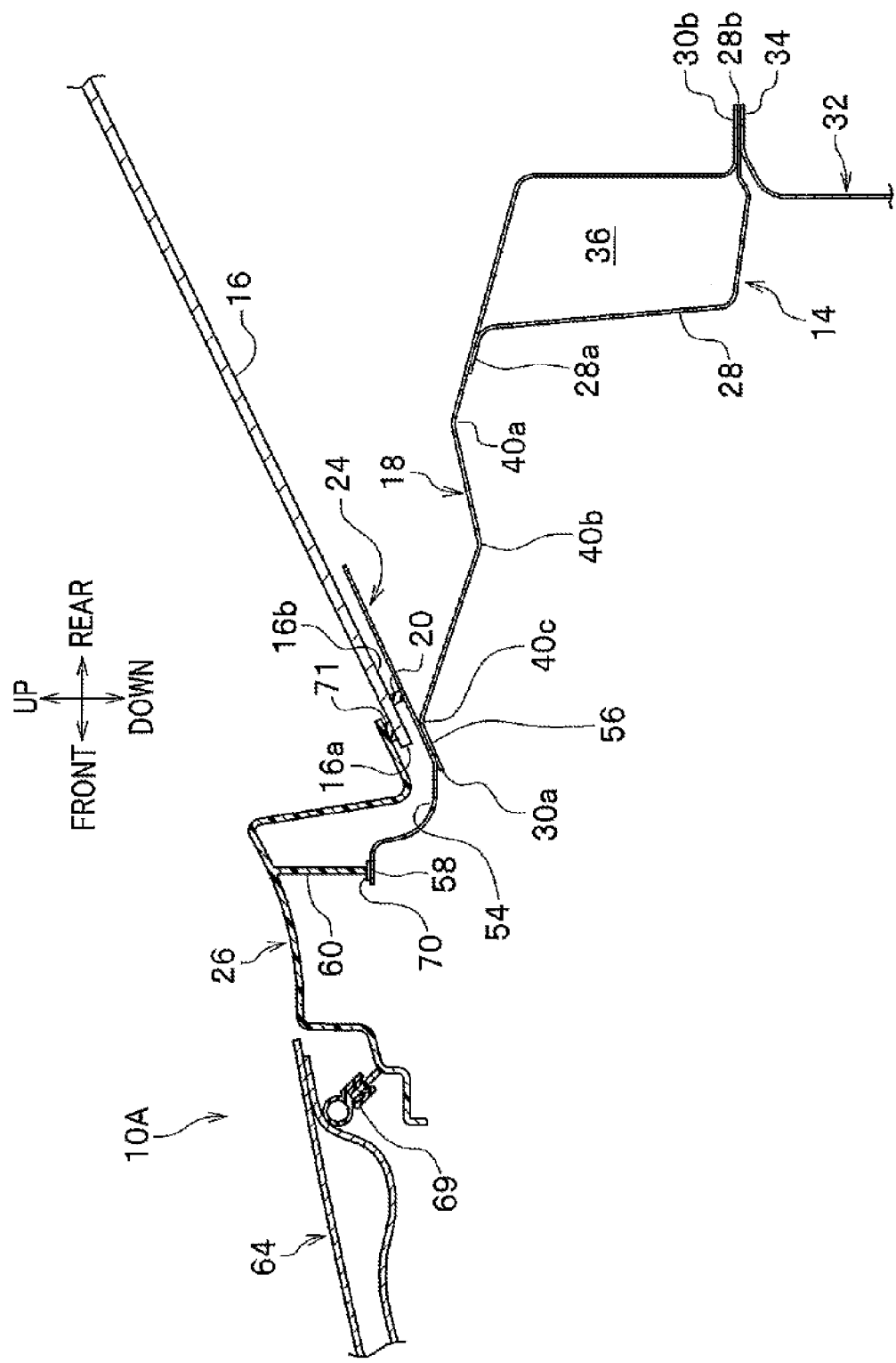
FIG. 2 is an end view taken along a II-II line in FIG. 1.

As shown in FIG. 2, a vehicle 10A applied with a windshield glass support structure (vehicle front structure) of the present invention includes: a relatively high rigid cross member 14 of which both end parts extending along the vehicle width direction are coupled to upper left and right members 12a, 12b (see FIG. 1); a windshield support panel 18 extending from the cross member 14 toward a lower end 16a of the windshield glass (windshield) 16; a glass support member 24 which is adhered to a lower end side of the windshield glass 16 via an adhesive 20 to support a lower end part of the windshield glass 16; and a cowl top 26 (see FIG. 1) arranged in front of the windshield glass 16. Note that in FIG. 2, reference numeral 64 indicates a hood which covers an upper surface of a power plant room (not shown), and reference numeral 69 indicates a seal member which seals an inner wall of the hood 64 and the cowl top 26, respectively. In addition, in FIG. 1, the hood 64 and the windshield glass 16 are omitted.

As shown in FIG. 2, the cross member 14 has a main body 28 having a substantially L-shaped vertical cross section, and an upper flange 28a and a lower flange 28b which continue to the main body 28 and extend along the vehicle width direction. Three parts, which are the lower flange 28b of the cross member 14, a rear end flange 30b of the windshield support panel 18 and an upper flange 34 of a dash lower panel 32, are joined integrally with joining means such as welding. Further, the upper flange 28a of the cross member 14 is joined to a side wall of the windshield support panel 18 to form a closed section 36 having a substantially rectangular shape with the cross member 14 and the windshield support panel 18.

The windshield support panel 18 is a member arranged on the lower end side of the windshield glass 16. A left raised part 38a and a right raised part 38b are arranged to be separated at a predetermined intervals at both left and right ends of the windshield support panel 18 along the vehicle width direction (see FIG. 4). First to third ridgelines 40a to 40c extending in the vehicle width direction and formed by polygonal lines in a vertical cross section in the vehicle front-rear direction are arranged between the left and right raised parts 38a, 38b (see FIGS. 2 and 4). Further, a blower opening 42 which is in a substantially rectangular shape and is connected to a blower (not shown) is formed at a rear side of the right raised part 38b (see FIG. 10A) in the vehicle front-rear direction. The first ridgeline 40a is a chevron shaped ridgeline extending between central parts in the vehicle front-rear direction on lower end edges of right and left inward inclined parts 103. The second ridgeline 40b is a V-shaped ridgeline extending between front end parts on the lower end edges of the right and left inward inclined parts 103. The third ridgeline 40c is a chevron-shaped ridgeline extending between front end parts on the upper end edges of the right and left inward inclined parts 103.

In other words, both ends of each of ridgelines 40a to 40c continue to the left and right raised parts 38a, 38b to be supported thereby, making the ridgelines 40a to 40c difficult to be broken to enhance rigidity thereof. In addition, a vicinity portion of the first ridgeline 40a in the windshield support panel 18 is joined and supported by the upper flange 28a of the relatively rigid cross member 14 from below (see FIG. 2), allowing the rigidity thereof to be further enhanced.

Further, reinforcement panels 46a, 46b (see FIG. 7) are arranged inside the left and right raised parts 38a, 38b of the windshield support panel 18. The reinforcement panels 46a, 46b continue to the upper flange (upper wall) 28a of the cross member 14 and extend to upper member inner panels 76, 76 (see FIG. 9, but one of them is not shown) which are end parts in the vehicle width direction. The reinforcement panels 46a, 46b have elliptical openings 48 communicating with the blower opening 42. Upper end edge parts 49 of the reinforcement panels 46a, 46b are joined to inner walls of the left and right raised parts 38a, 38b of the windshield support panel 18, and lower end edge parts 51 of the reinforcement panels 46a, 46b are joined to the upper flange 28a of the cross member 14 (see FIG. 6).

A front end flange (front edge) 30a of the windshield support panel 18 is joined to the glass support member 24. The rear end flange 30b of the windshield support panel 18 is, as described above, joined to the lower flange 28b of the cross member 14 and the upper flange 34 of the dash lower panel 32. Both the right and left end parts of the windshield support panel 18 in the vehicle width direction are joined to the right and left upper member inner panels 76, 76 (see FIGS. 9 and 10C), respectively.

The glass support member 24 is a member which extends in the vehicle width direction in planar view (see FIG. 3), and which inclines from the front end flange (front edge) 30a of the windshield support panel 18 rearward and upward of the vehicle along a lower side surface 16b (lower inner surface) of the windshield glass 16 in the vertical cross section in the vehicle front-rear direction (see FIG. 2). The glass support member 24 is arranged, with a predetermined clearance, to be parallel or substantially parallel with the lower side surface 16a of the windshield glass 16.

At both end parts of the glass support member 24 in the vehicle width direction, cowl top fixing parts 52 are arranged which fasten (join) the windshield support panel 18 with fastening members such as bolts. Note that in the present embodiment, a plurality bolts are used for fastening at three points, but it is not limited thereto.

At a front part of the glass support member 24 perpendicular to the vehicle width direction, a drain 54 is arranged which extends in the vehicle width direction and hollows downward. A rear part of the drain 54, formed with the glass support member 24, perpendicular to the vehicle width direction overlaps with a front part of the windshield support panel 18. Thus, the rear part joins an upper surface of the front end flange 30a of the windshield support panel 18 to form a joining part 56 (see FIG. 2). Note that the joining part 56 includes a state in which the parts are only abutting with each other, in addition to a state in which the parts are joined by welding or the like.

As shown in FIG. 2, the drain 54 is formed to have a vertical cross section in an arc shape. Further, the drain 54 is arranged so as to extend from the joining part 56 with the windshield support panel 18 frontward in the vehicle front-rear direction. A front edge flange 58 of the drain 54 extending frontward from the joining part 56 abuts on a partition wall 60 (to be described later) of the cowl top 26 to close the drain 54. Further, both end parts of the drain 54 in the vehicle width direction are connected to intake passages 62 (to be described later) arranged at right and left sides of the vehicle.

The cowl top 26 extends in the vehicle width direction, and is formed with, for example, a resin member. As shown in FIG. 1, the cowl top 26 includes a left and right outside air intake ports 66a, 66b positioned at both a left and right end parts in the vehicle width direction, a cowl raised part 68 in a rectangular shape in planar view which is arranged between the left and right outside air intake ports 66a, 66b, and the partition wall 60 (see FIG. 2) which extends from an upper surface of the cowl top 26 downward and abuts on the front edge flange 58 of the drain 54 via a seal member 70. Further, a seal member 71 is interposed between a rear end of the cowl top 26 in the front-rear direction of the vehicle and the outer surface of the windshield glass 16 at the lower end side. Note that water guided into the drain 54 of the glass support member 24 flows onto upper surfaces of left and right damper base supports 72a, 72b (to be described later) arranged at the left and right end sides of the vehicle 10. Then, the water is discharged from the left and right damper base supports 72a, 72b to openings 78 of the upper member inner panels 76 (see FIG. 9).

Figure 3:
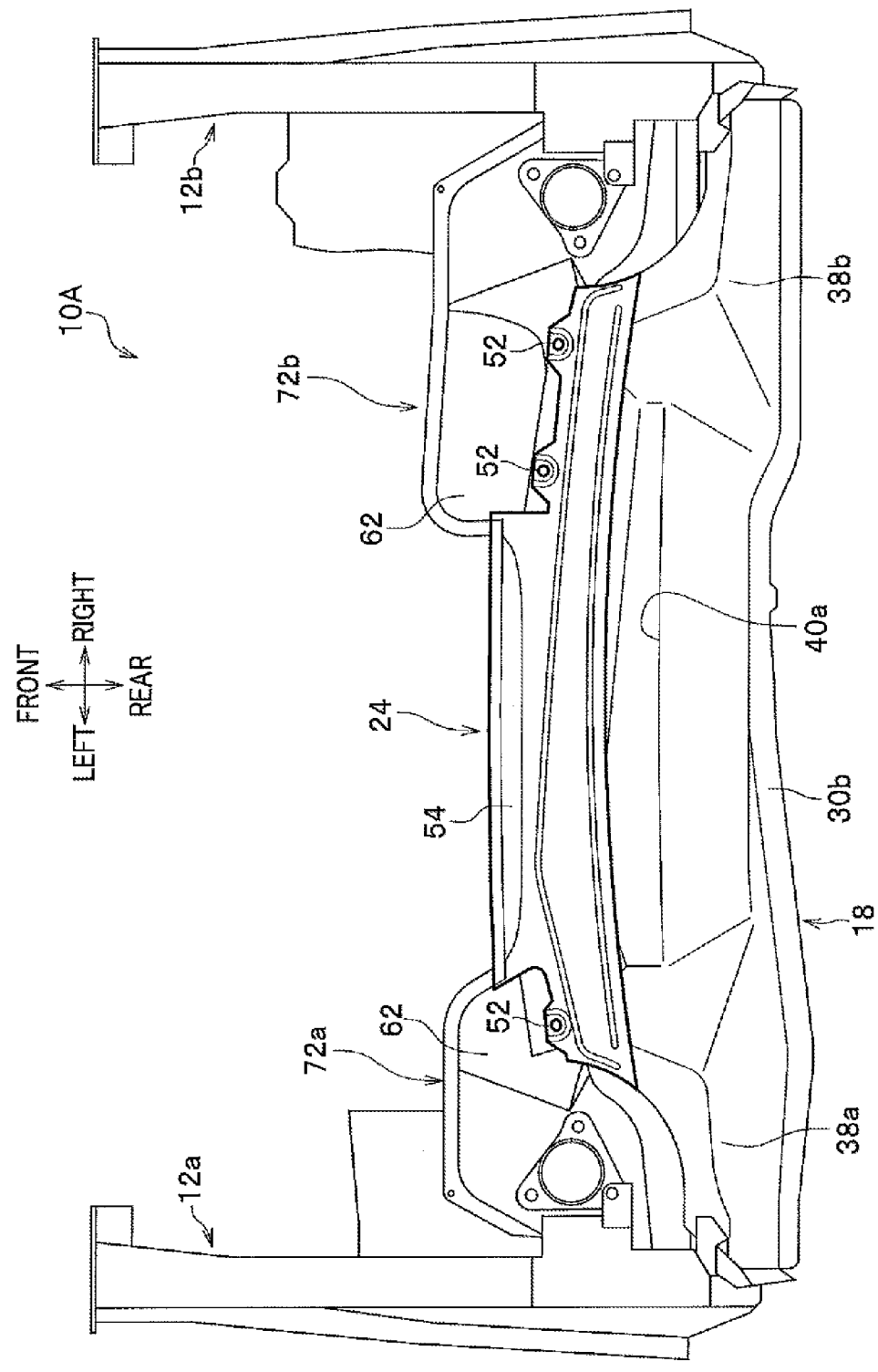
FIG. 3 is a plan view without a cowl top in FIG. 1.
Figure 7:
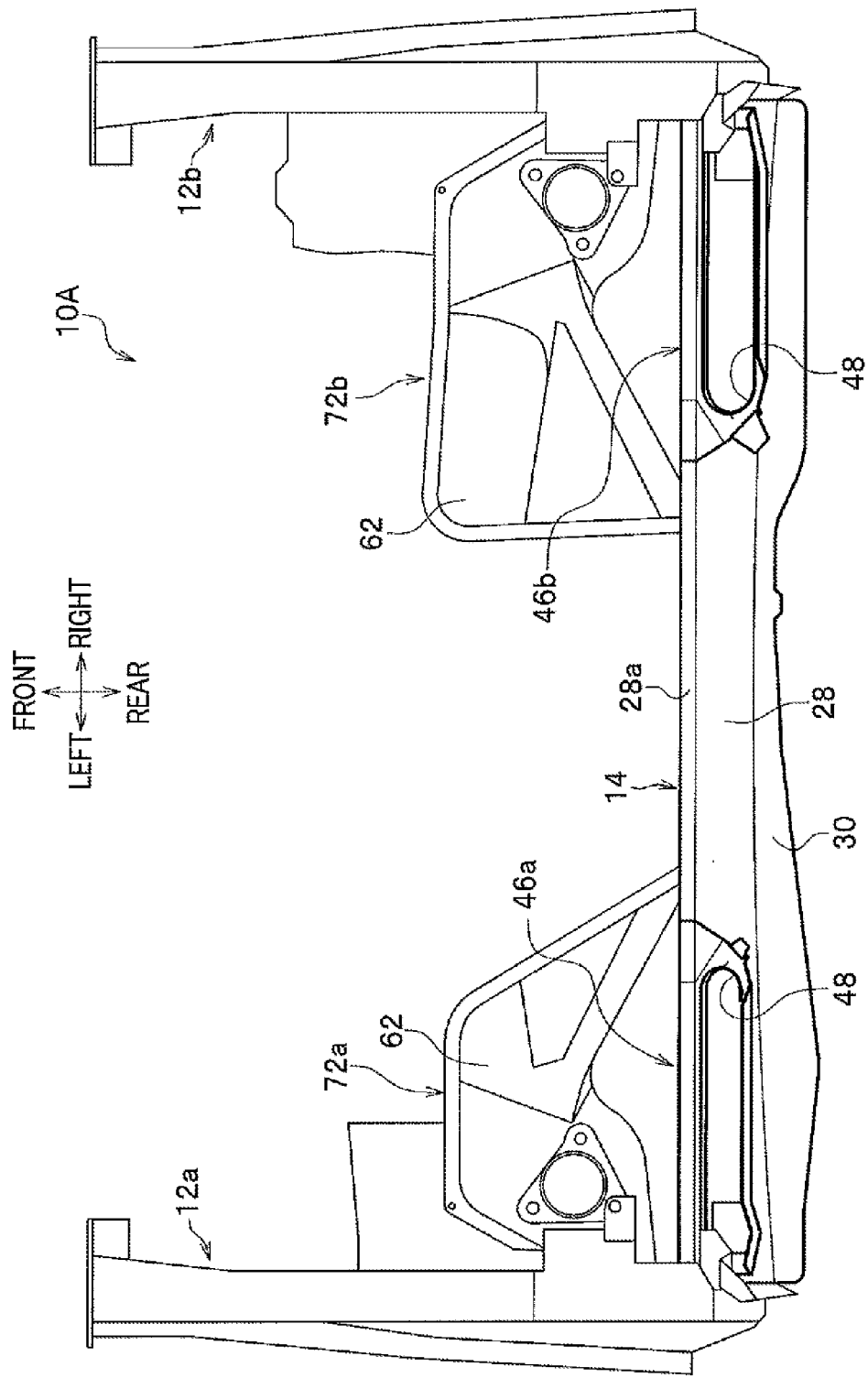
FIG. 7 is a plan view without a windshield support panel in FIG. 4.

As shown in FIGS. 3 and 7, the left and right damper base supports 72a, 72b which upper surfaces form the intake passages 62 are provided under both end sides of the cowl raised part 68, respectively. The cowl top 26 is supported by the left and the right damper base supports 72a, 72b in the vehicle width direction (see FIG. 8). The left and the right damper base supports 72a, 72b are arranged apart at a predetermined distance in the horizontal direction and are joined on the upper surfaces of the left and right damper bases 74a, 74b to be supported thereby (see FIG. 9).

Figure 10A:
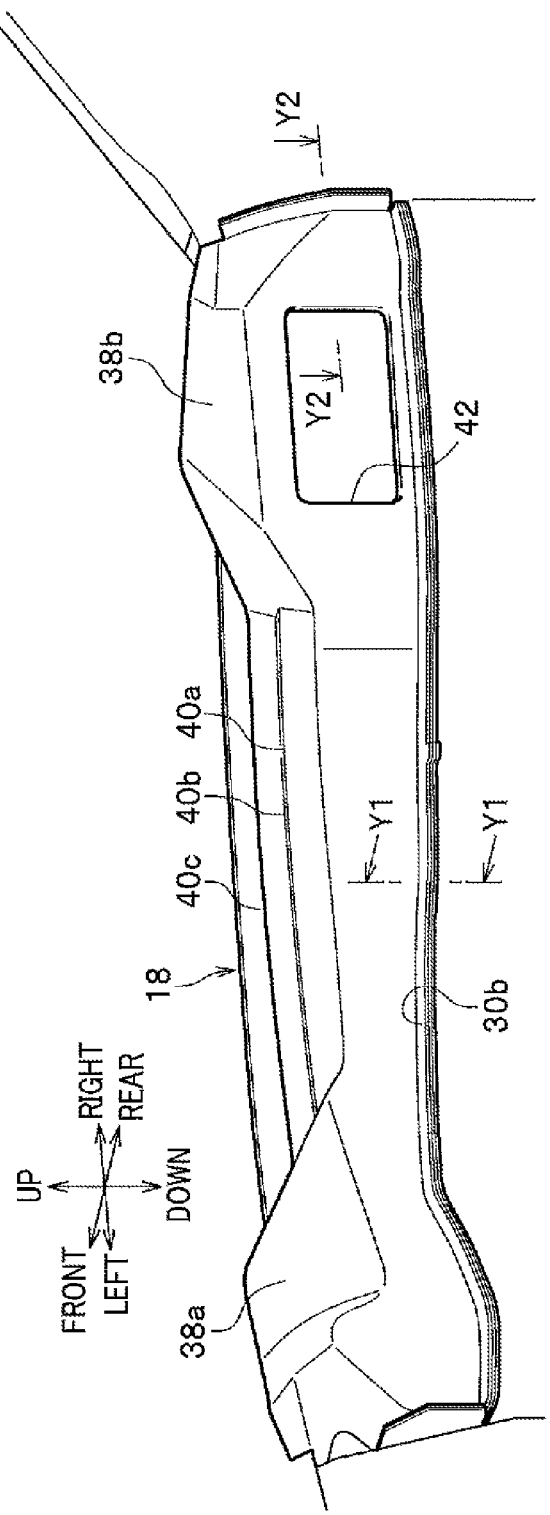
FIG. 10A is a perspective view of the windshield support panel seen from a diagonally rear side.

Each intake passage 62 includes a first passage and a second passage which join at the blower opening 42 (see FIG. 10A). In the first passage, air taken through the outside air intake port 66b arranged at a front right side of the cowl top 26 flows on the upper surface of the right damper base support 72b and is discharged from the blower opening 42 toward a blower side (not shown) (see FIG. 6). In the second passage, air taken through the outside air intake port 66a arranged at a front left side of the cowl top 26 flows on the upper surface of the left damper base support 72a. The air further flows from the left side to the right side in the vehicle width direction due to the closed section 36 (see FIG. 2) formed between the windshield support panel 18 and the cross member 14. Then, the air is discharged from the blower opening 42 toward the blower (not shown).

Figure 6:
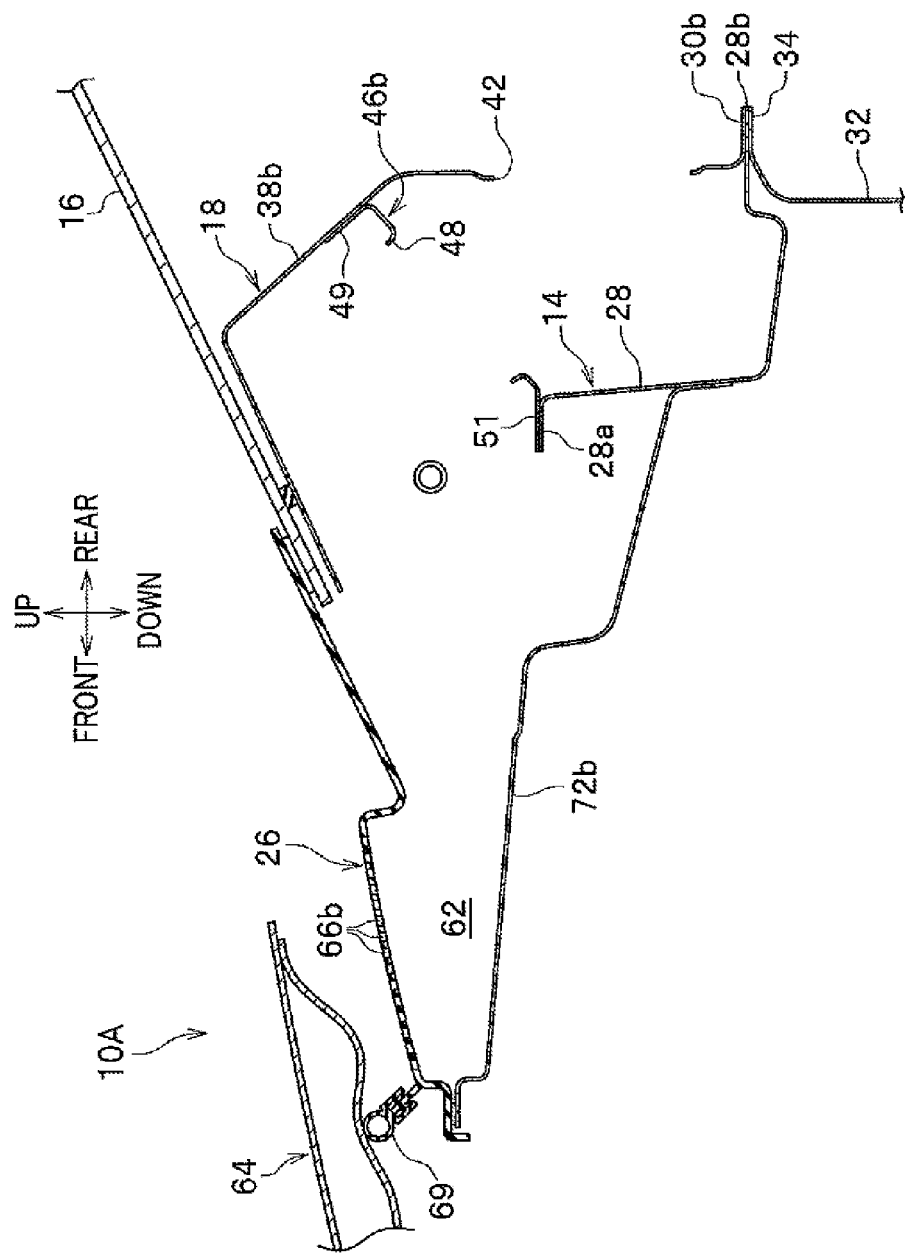
FIG. 6 is an end view taken along a VI-VI line in FIG. 1.

Further, each intake passage 62 is configured to extend such that a height size in the up-down direction of the intake passage 62 decreases frontward in the vehicle front-rear direction (see FIG. 6). Still further, the intake passages 62 are formed by the left and right raised parts 38*a*, 38*b* of the windshield support panel 18, the damper base supports 72*a*, 72*b*, and the cowl top 26 (see FIG. 6). The raised parts 38*a*, 38*b* and the damper base supports 72*a*, 72*b* extend frontward in the vehicle front-rear direction from the cross member 14 and are arranged in the vehicle up-down direction. The cowl top 26 is attached between the damper base supports 72*a*, 72*b* and the windshield support panel 18.

Note that the left upper left and right upper member inner panels 76, 76 are joined to the left and right member 12*a*, 12*b* via upper member reinforcing members (not shown). A front pillar 80 extending diagonally upward is joined at the rear of the upper left and right members 12*a*, 12*b* (see FIG. 9).

The vehicle 10A applied with the windshield glass support structure according to the present embodiment is basically formed as described above, and the operational effects thereof will be explained below.

Figure 13:
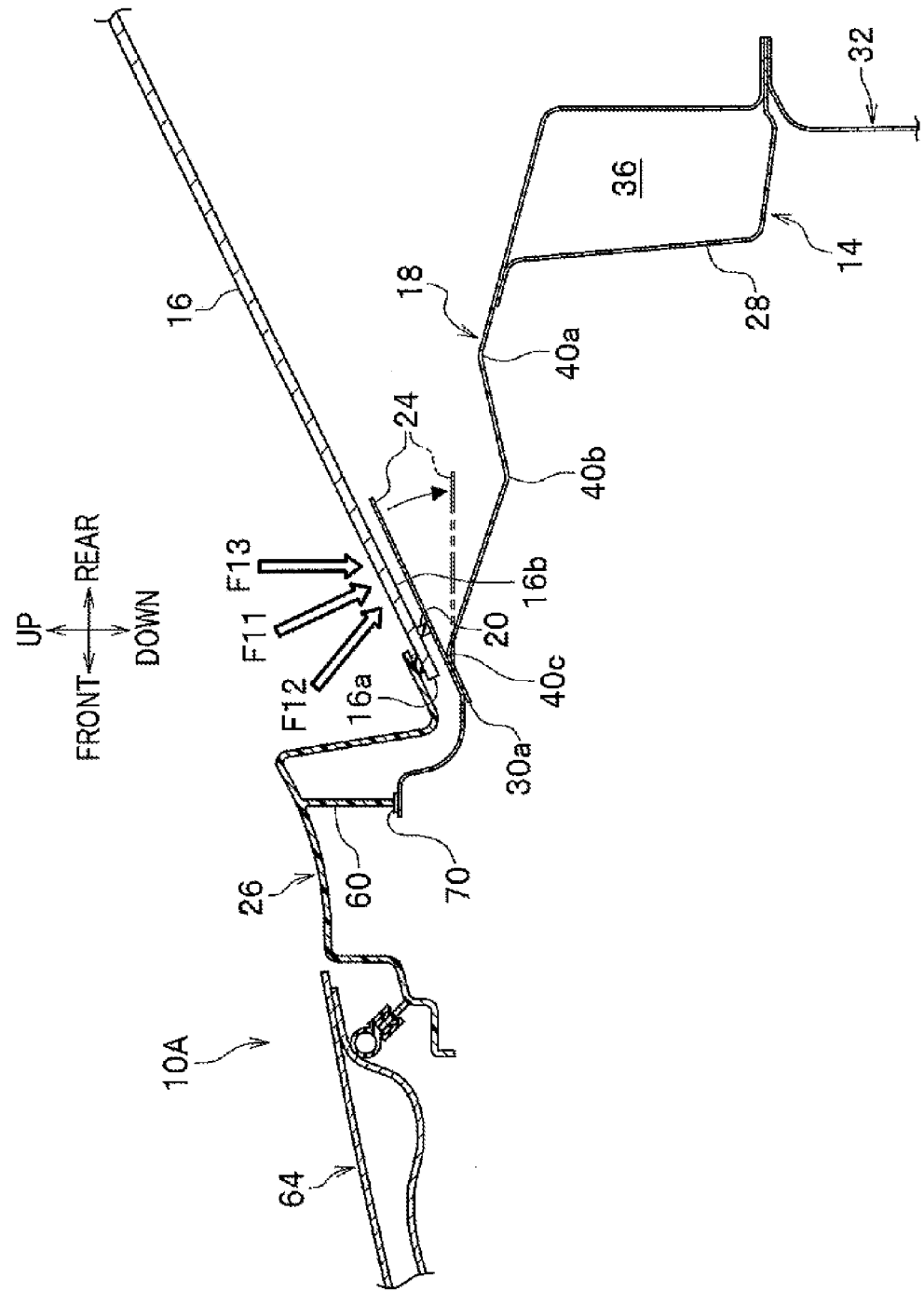
FIG. 13 is an end view when external force is applied at any angle from a front in the vehicle front-rear direction.

In the present embodiment, as shown in FIG. 13, the glass support member 24 is arranged to incline rearward and upward in the vehicle front-rear direction from the front edge (front end flange 30*a*) of the windshield support panel 18 along the lower side surface 16*b* of the windshield glass 16. Therefore, for example, if external force F11, F12 or F13 is applied at any angle to the outer surface at the lower end part of the windshield glass 16, the glass support member 24 may deform (see two-dot chain line in FIG. 13) to absorb an impact load caused by the external force F.

Note that in FIG. 13, the external force applied in a direction orthogonal to an axis line of the glass support member 24 is referred to as F11, the external force applied in a direction inclined horizontally with respect to the external force F11 is referred to as F12, and the external force applied downward in the vertical direction is referred to as F13. However, the applying angles of the external force given to the outer surface of the windshield glass 16 are not limited to the angles of the external force F11 to F13.

In other words, in the present embodiment, the reaction force R (see FIG. 24) oppositely facing the external force F to cancel out with each other can be preferably avoided from occurring. Therefore, even in a case where the external force F is applied at any angle to the outer surface of the windshield glass 16, the impact load caused by the external force F can be preferably absorbed.

Figure 4:
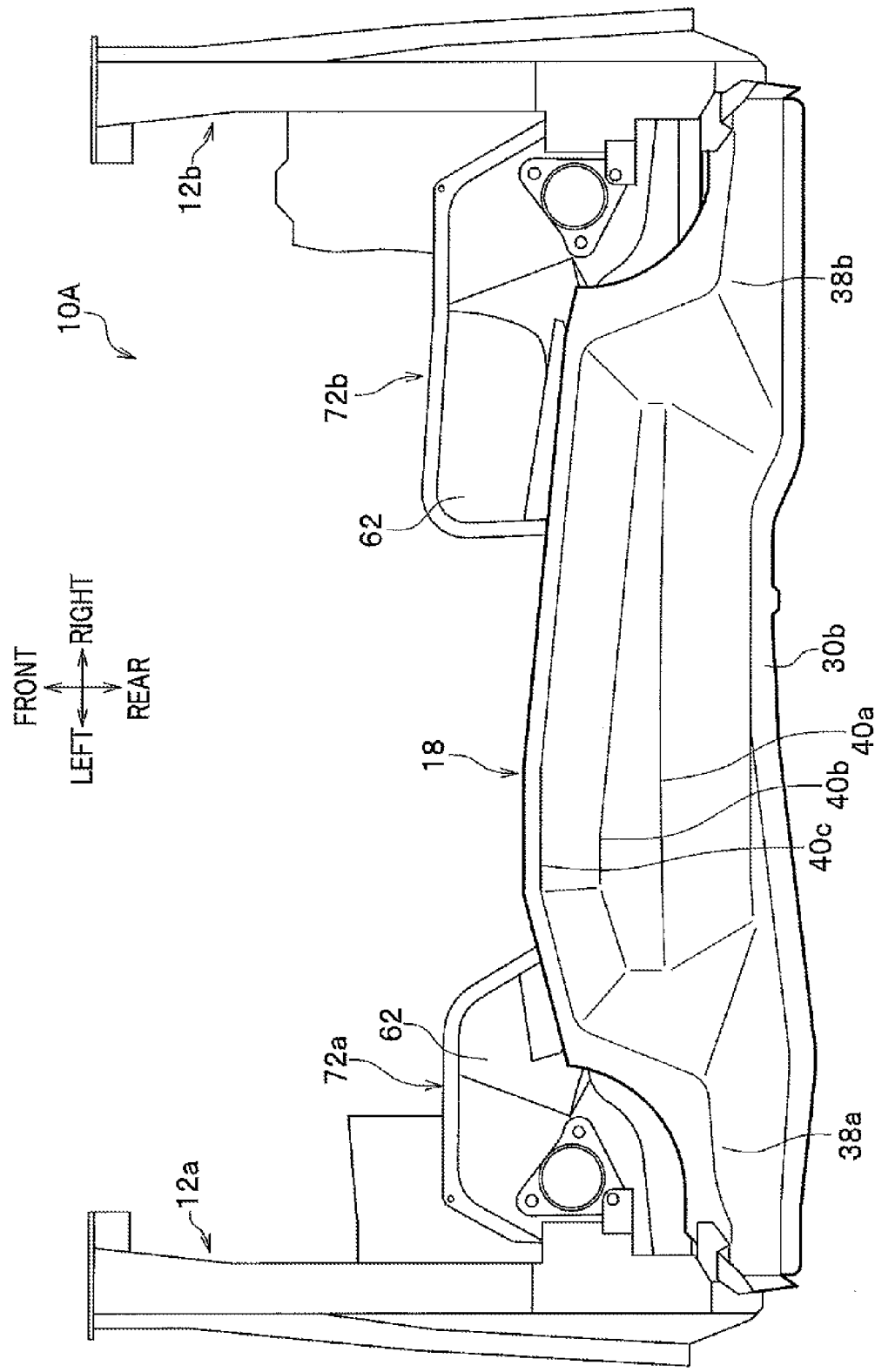
FIG. 4 is a plan view without a glass support member in FIG. 3.

Further, in the present embodiment, the windshield support panel 18 has the first to third ridgelines 40*a* to 40*c* extending in the vehicle width direction (see FIGS. 2 and 4). This allows the windshield support panel 18 to have higher rigidity and can improve support rigidity at the lower end part of the windshield glass 16 to reduce vibration of the windshield glass 16.

In this case, since a base part of the windshield support panel 18 is supported by the cross member 14 having relatively high rigidity (see FIG. 2), the support rigidity can be further improved at the lower end part of the windshield glass 16.

Further, in the present embodiment, the left and right raised parts 38*a*, 38*b* are arranged at both the left and right end sides of the windshield support panel 18 and the first to third ridgelines 40*a* to 40*c* are formed continuously between the left and right raised parts 38*a*, 38*b* (see FIG. 4). Therefore, the rigidity of the windshield support panel 18 can be enhanced and the support rigidity can be further improved at the lower end part of the windshield glass 16. The vibration of the windshield glass 16 can also be decreased.

Still further, in the present embodiment, both the end parts of the glass support member 24 in the vehicle width direction are joined on the upper surfaces of the left and right raised parts 38*a*, 38*b* (see FIG. 3). Therefore, the support rigidity can be further improved at the lower end part of the windshield glass 16 and the vibration of the windshield glass 16 can be further decreased.

Figure 5:
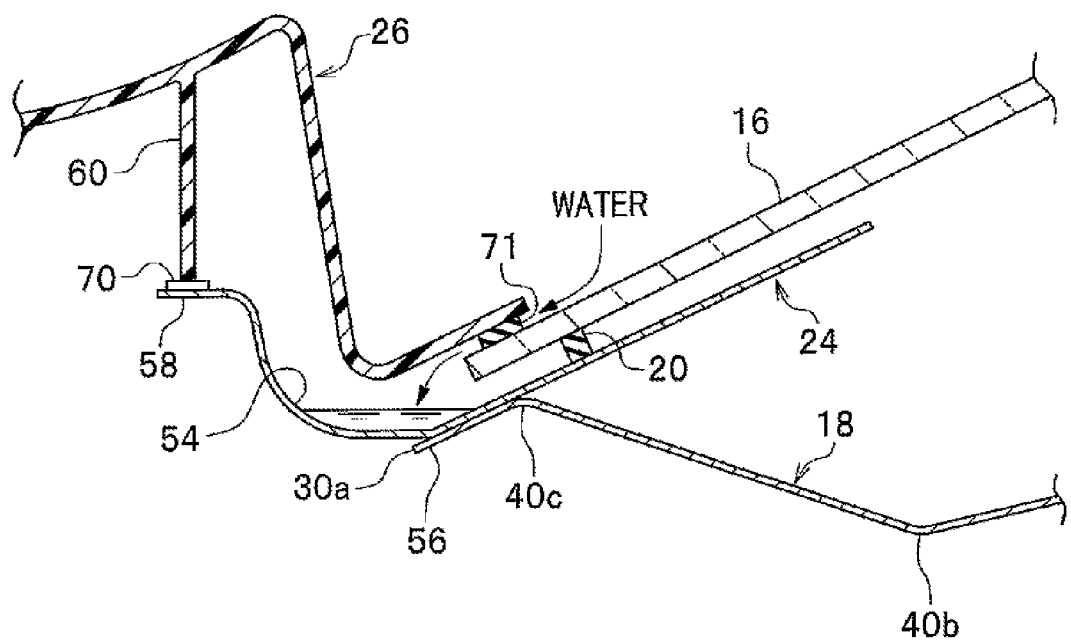
FIG. 5 is a partially enlarged end view of FIG. 2.

Still further, in the present embodiment, the drain 54 is arranged at a position where the glass support member 24 extends forward from the joining part 56 with the windshield support panel 18 (see FIG. 5). Even if water (such as rain water or water at the time of car washing) leaks from the seal member 70 interposed between the outer surface of the windshield glass 16 at a lower end and the cowl top 26, the drain 54 can discharge the leaked water from the seal member 70 from side to side. Therefore, the leaked water can be preferably prevented from flowing into an engine compartment.

Still further, in the present embodiment, the partition wall 60 of the cowl top 26 abuts on the front edge flange 58 of the drain 54 via the seal member 70 to close a space inclusive of the drain 54 (see FIG. 5). Therefore, relatively large amount of water can be drained. In other words, the partition wall 60 of the cowl top 26 positioned higher than the drain 54 is arranged at a front edge of the drain 54, allowing capacity in the space inclusive of the drain 54 to be increased to drain relatively large amount of water.

Figure 8:
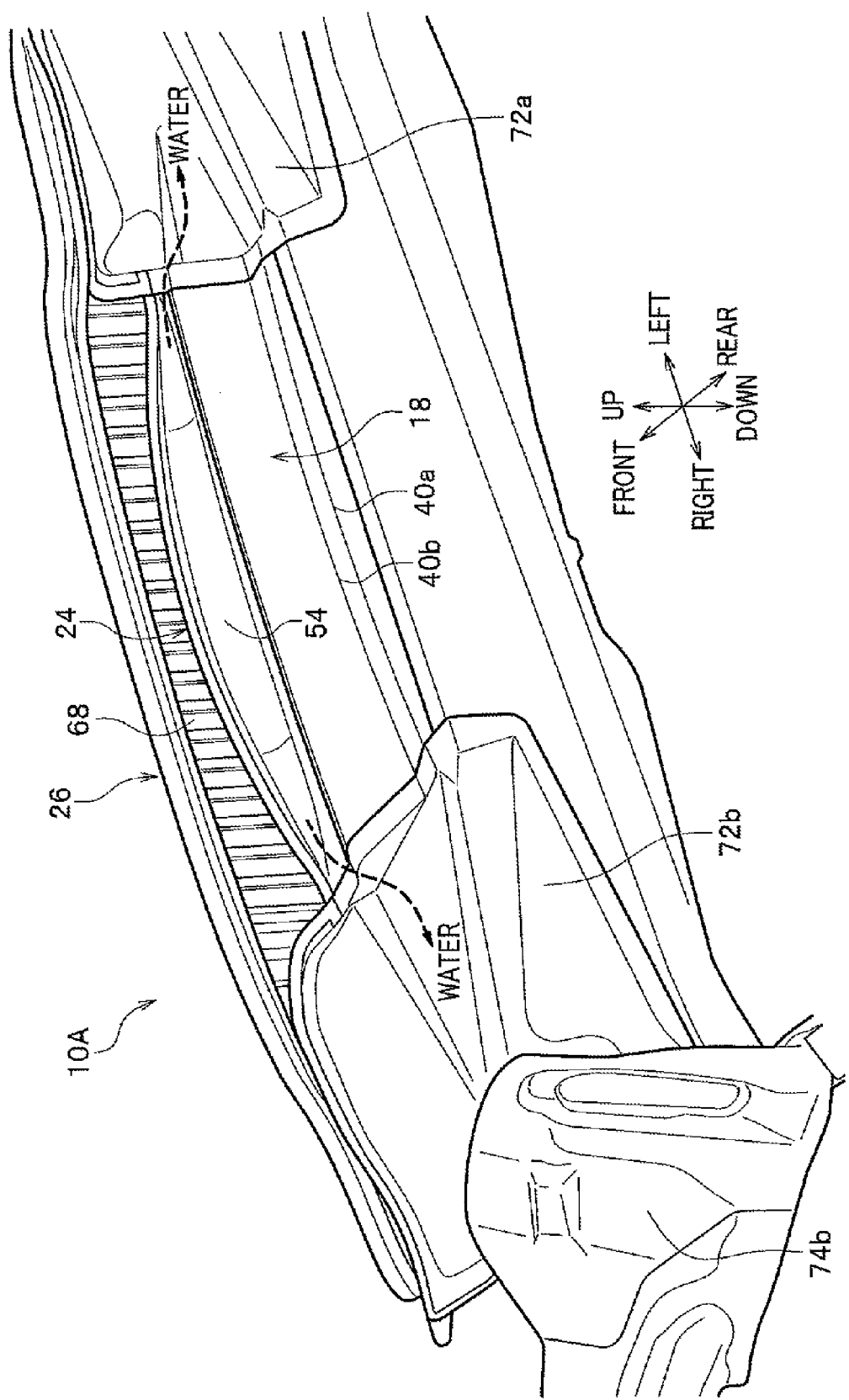
FIG. 8 is a perspective view of damper base supports, the glass support member and the cowl top seen from a bottom side.

Still further, in the present embodiment, both the end sides of the drain 54 in the vehicle width direction are connected to the right and left intake passages 62 (first and second passages) (see FIGS. 6 to 9). This allows the water to be drained through the intake passages 62 to an outside and a drain structure to be simplified. Note that FIG. 8 is a perspective view of the glass support member 24, and the left and right damper base supports 72*a*, 72*b* seen from the bottom side. The water guided into the drain 54 being drained toward upper surface sides of the left and right damper base supports 72*a*, 72*b* is indicated by dotted lines.

Figure 9:
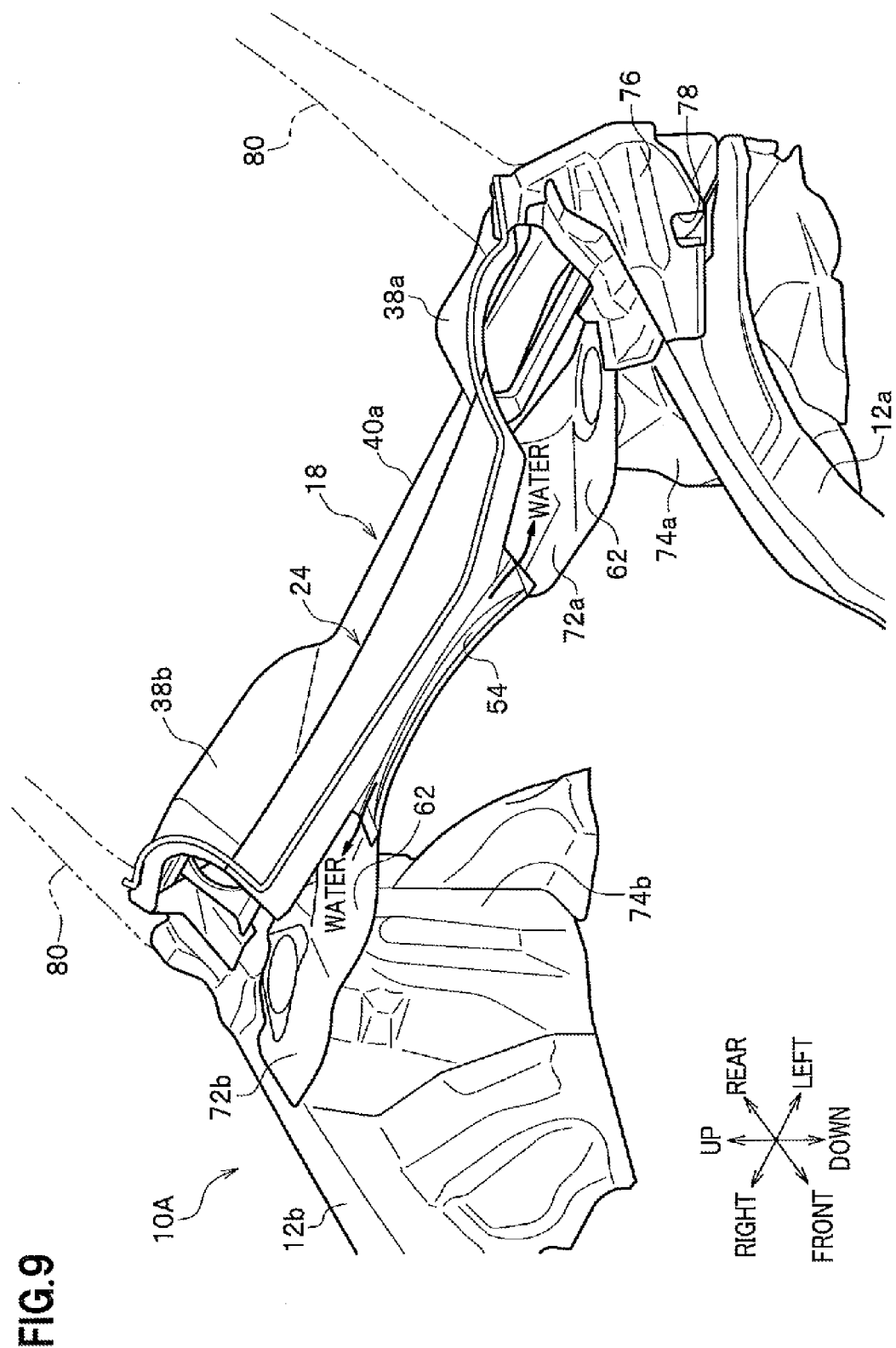
FIG. 9 is a perspective view without the cowl top.
Figure 10C:
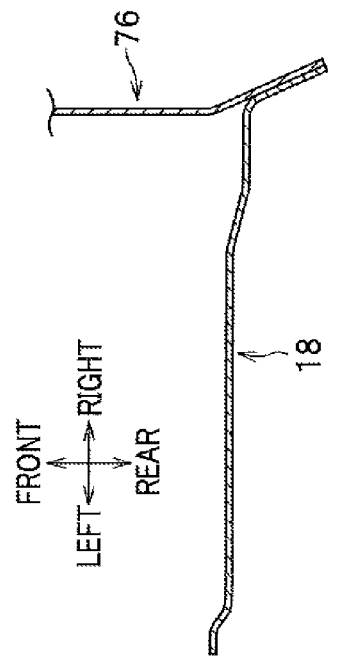
FIG. 10C is an end view taken along a Y2-Y2 line in FIG. 10A.
Figure 10B:
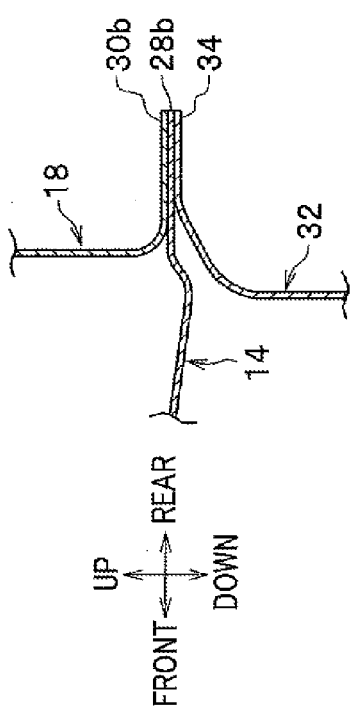
FIG. 10B is an end view taken along a Y1-Y1 line in FIG. 10A.

That is, the water guided into the drain 54 of the glass support member 24 flows on the upper surfaces of the left and right damper base supports 72*a*, 72*b* arranged at the left and right end sides of the vehicle 10 (see arrows in FIG. 9). Then, the water is discharged from the left and right damper base supports 72*a*, 72*b* to the openings 78 (see FIG. 9) of the upper member inner panels 76. Finally, the water drops in wheel houses (not shown) and is drained therefrom.

Figure 11:
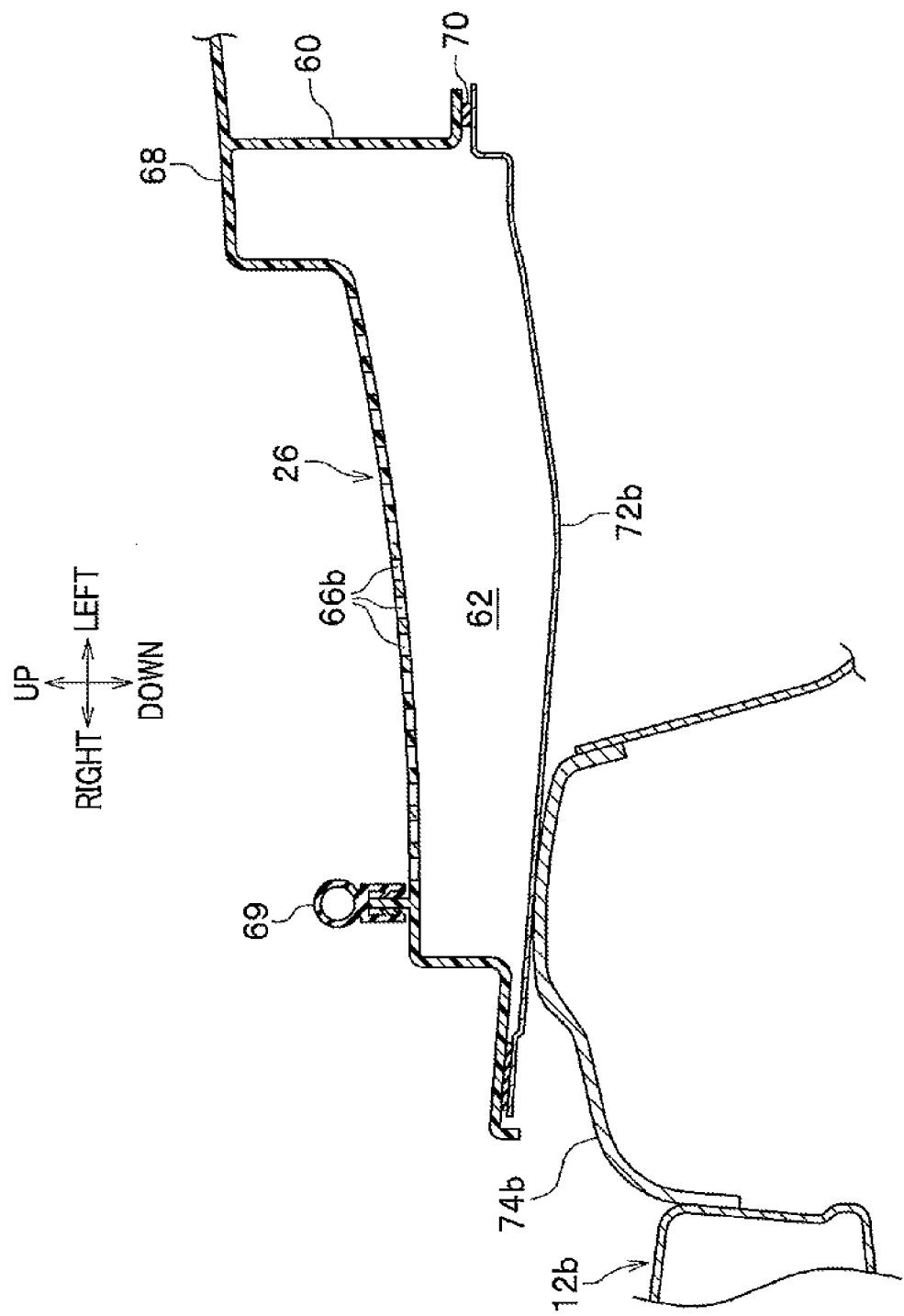
FIG. 11 is an end view taken along a XI-XI line in FIG. 1.

Still further, in the present embodiment, both the end sides of the cowl raised part 68 are supported by the damper base supports 72*a*, 72*b* that form the intake passages 62 (see FIG. 11). Therefore, for example, even if the cowl raised part 68 is not supported from underneath by any members on a vehicle body side, the cowl raised part 68 generates substantial reaction force against the external force F (not shown) applied from diagonally above the cowl raised part 68 and deforms to absorb an impact load caused by external force F4.

Still further, in the present embodiment, the intake passages 62 extend such that the height size in the up-down direction decreases frontward in the the vehicle front-rear direction (see FIG. 6). In addition, the intake passages 62 are formed by the left and right raised parts 38*a*, 38*b* of the windshield support panel 18, the left and right damper base supports 72a, 72b, and the cowl top 26. The raised parts 38a, 38b and the damper base supports 72a, 72b extend frontward in the vehicle front-rear direction from the cross member 14 and are arranged in the vehicle up-down direction. The cowl top 26 is attached between the left and the right damper base supports 72a, 72b and the windshield support panel 18. In the present embodiment, the windshield glass support structure formed in this way can keep substantial amount of intake air, and, for example, each member forming the intake passages 62 can be easily deformed against the external force F (not shown) to absorb the impact load caused by the external force F.

Figure 12:
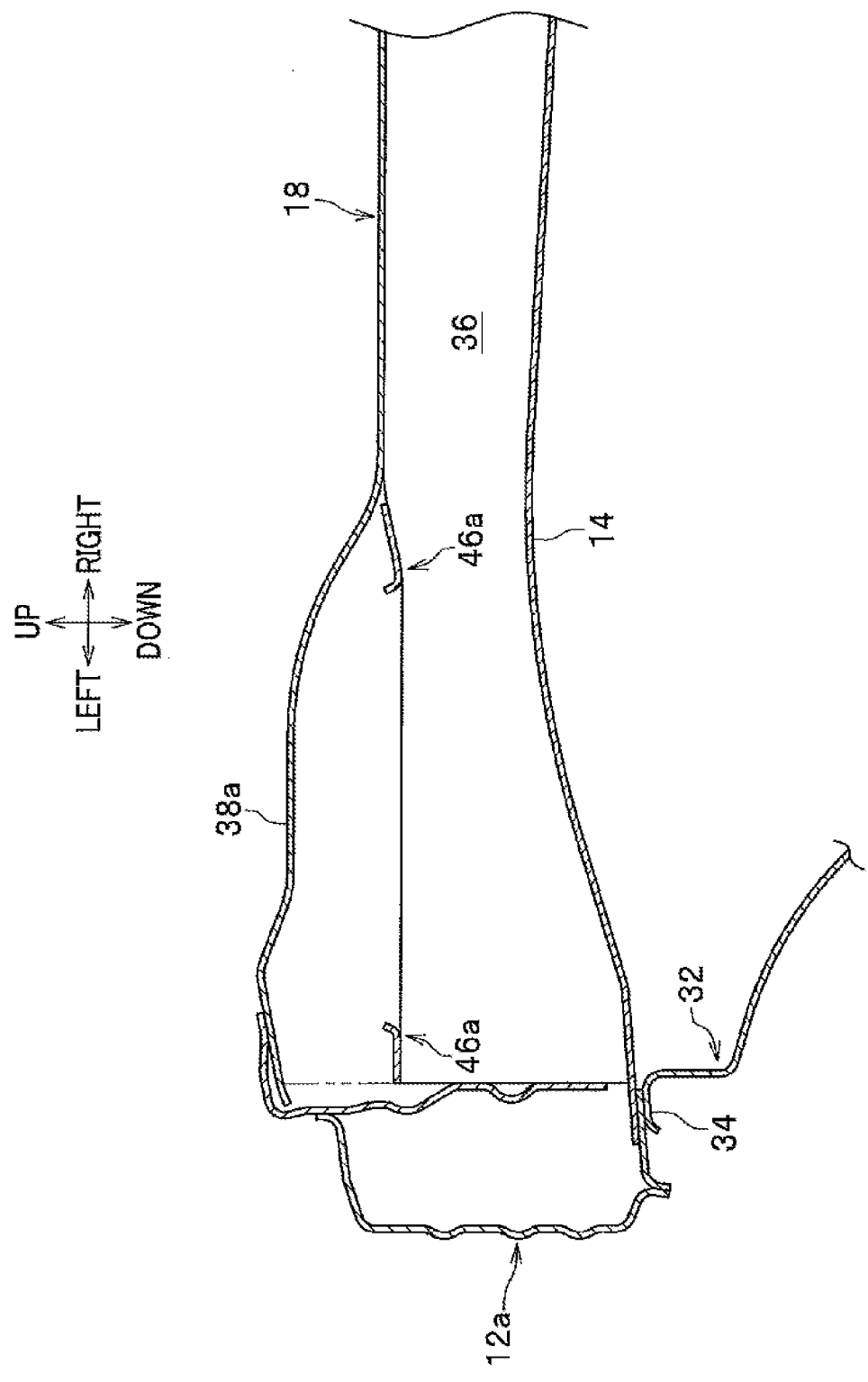
FIG. 12 is an end view of a closed section formed between a cross member and the windshield support panel.

Yet further, in the present embodiment, the left and right raised parts 38a, 38b of the windshield support panel 18 include the reinforcement panels 46a, 46b which continue to the upper flange 28a of the cross member 14 (see FIGS. 6 and 7). Therefore, the closed section 36 of the cross member 14 can be extended up to around the front pillar 80 (see FIG. 12).

Second Embodiment

Next, a vehicle applied with a windshield glass support structure (vehicle front structure) according to a second embodiment of the present invention will be explained focusing on the difference from the vehicle 10A according to the first embodiment.

Figure 14:
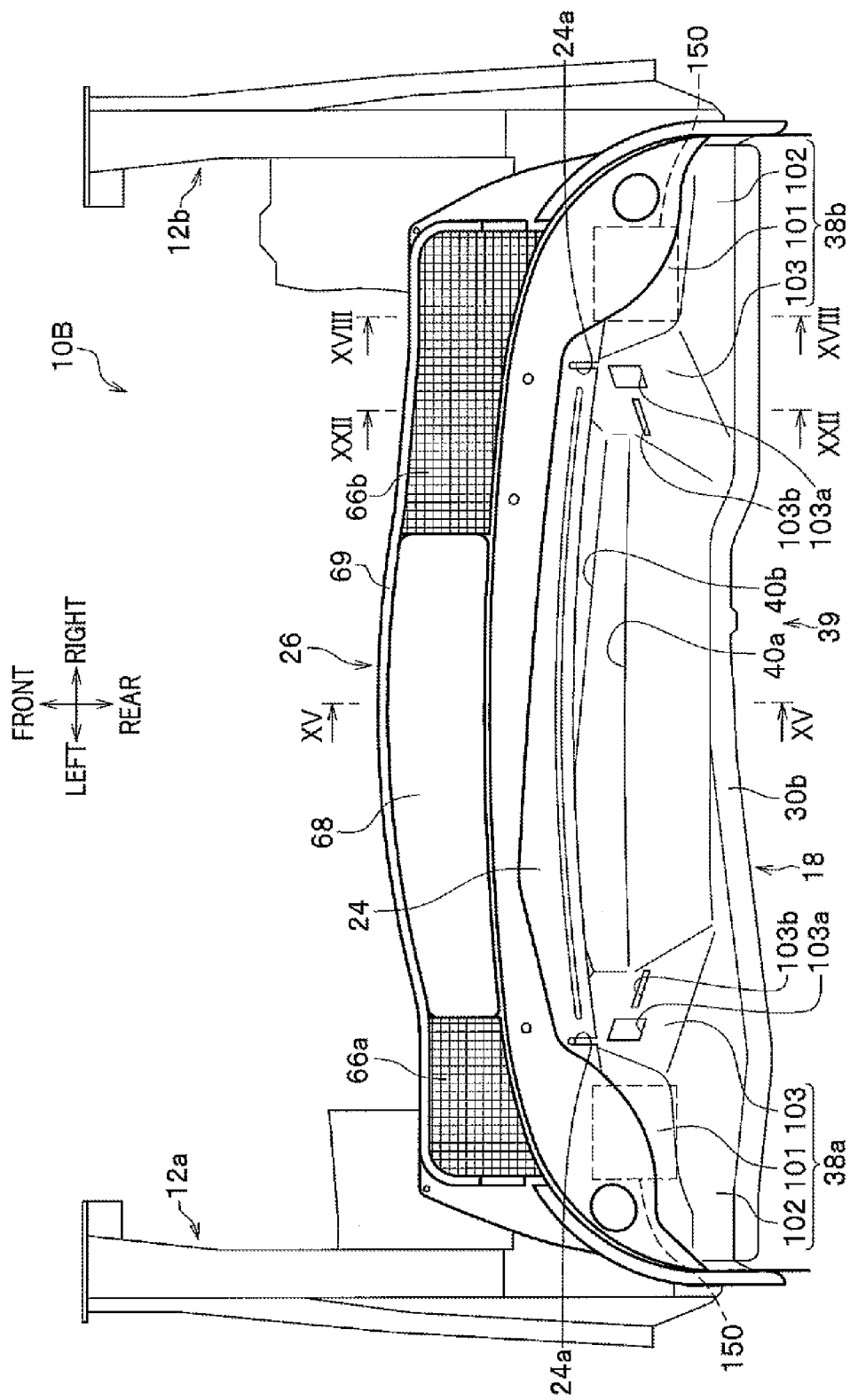
FIG. 14 is a partially plan view of the vehicle which is applied with the windshield glass support structure according to a second embodiment of the present invention.
Figure 16:
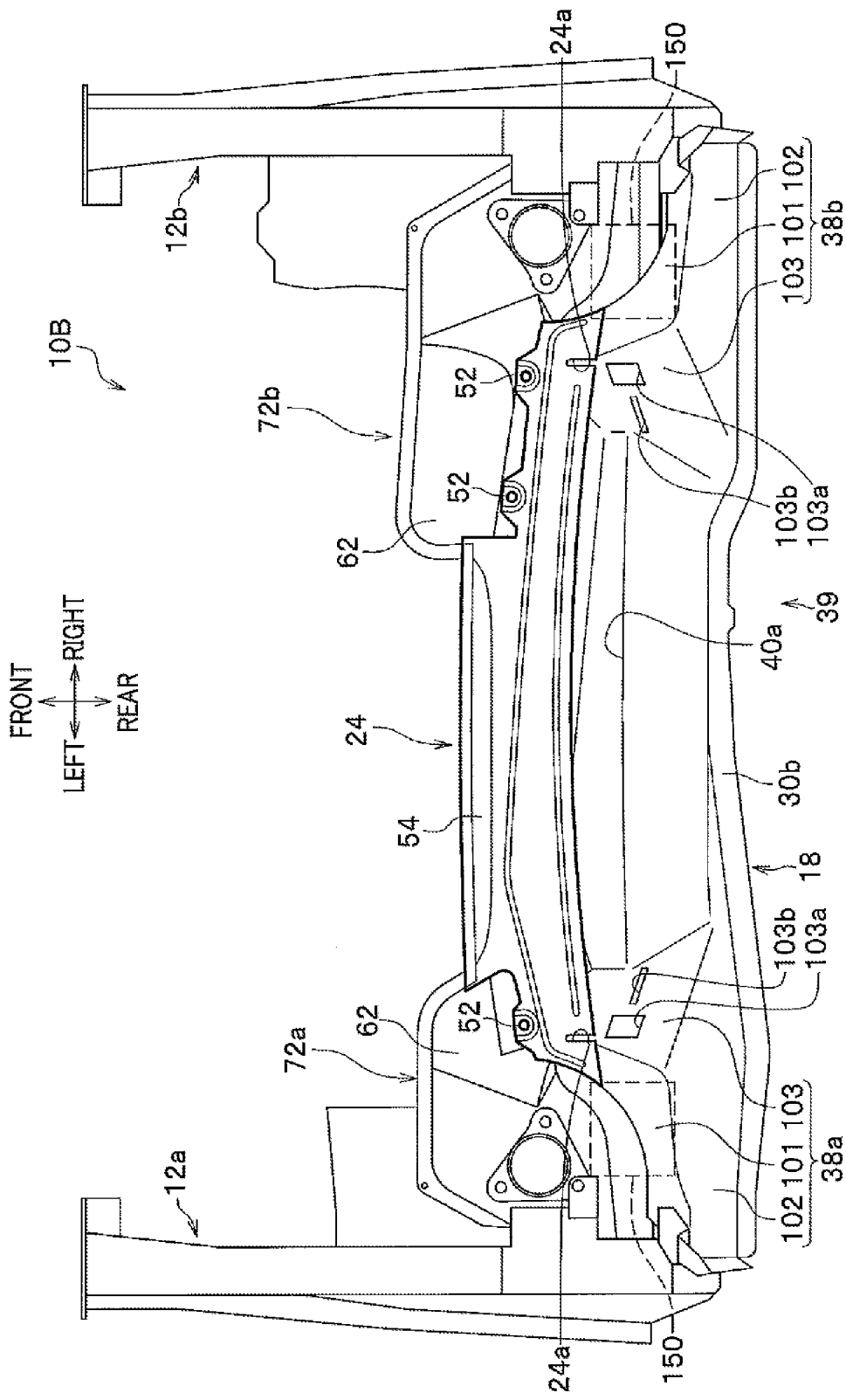
FIG. 16 is a plan view without the cowl top in FIG. 14.
Figure 17:
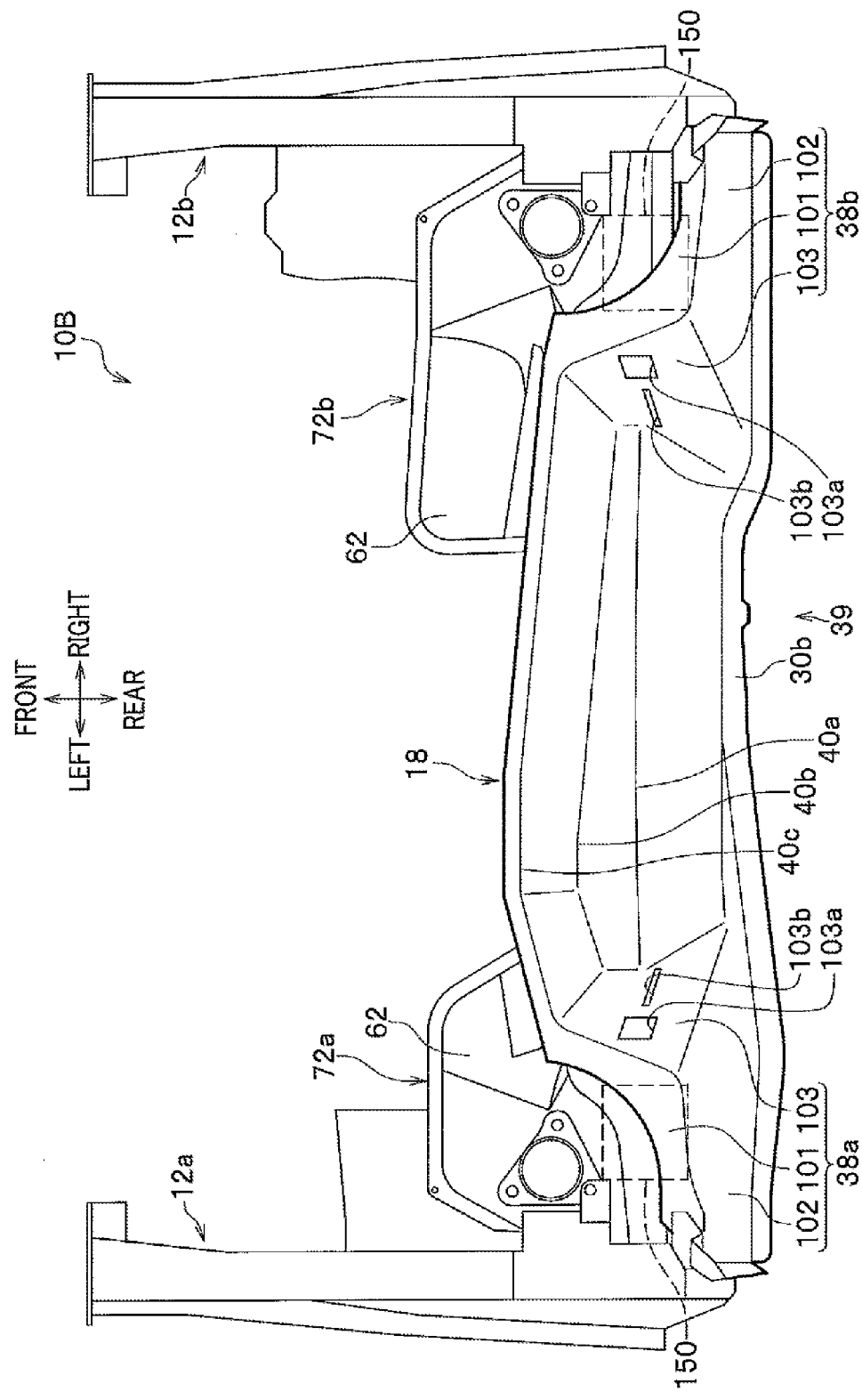
FIG. 17 is a plan view without the glass support member in FIG. 16.
Figure 18:
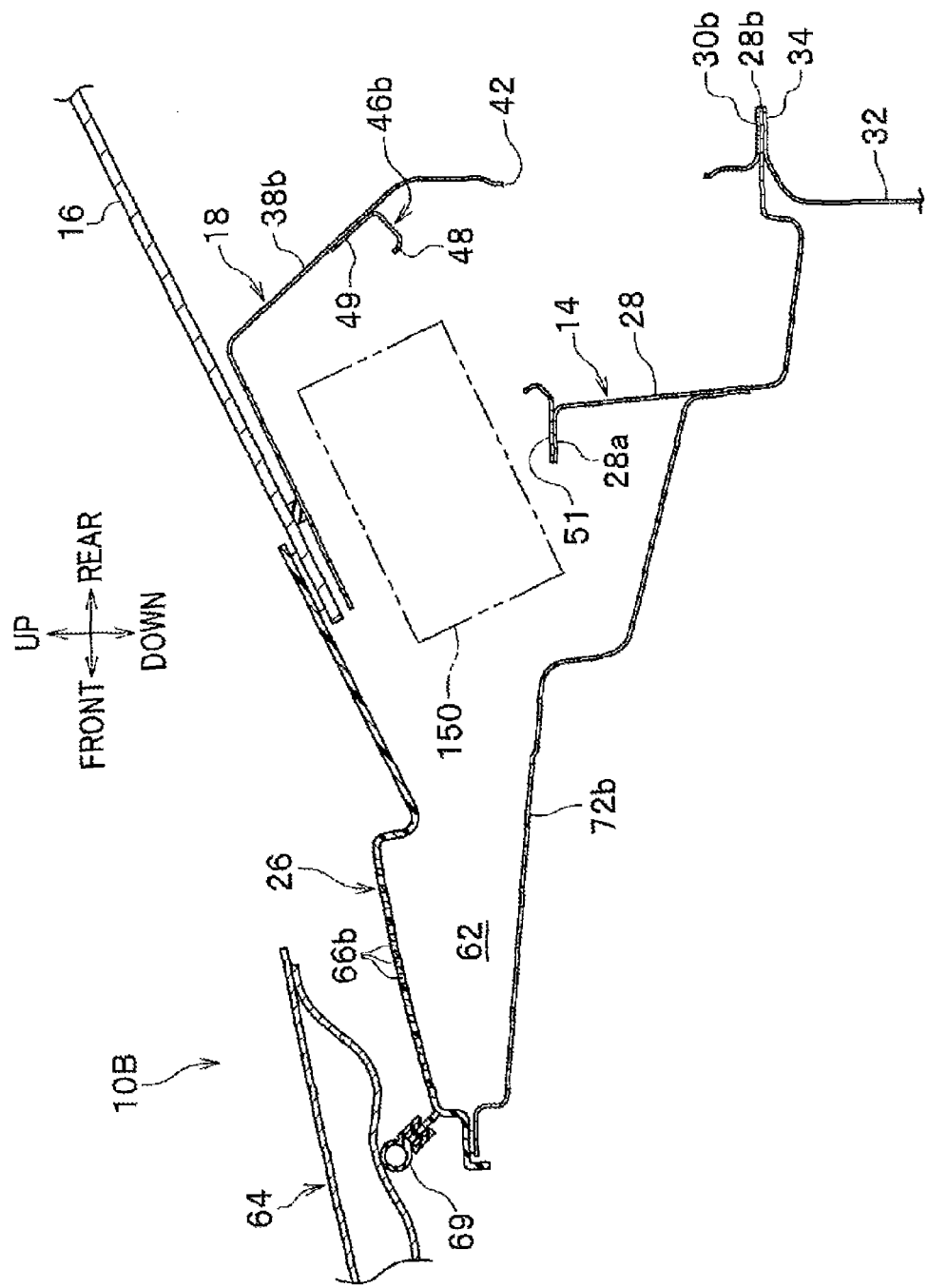
FIG. 18 is an end view taken along a XVIII-XVIII line in FIG. 14.

As shown in FIGS. 14, 16, 17 and 18, in a vehicle 10B applied with the windshield glass support structure according to the present embodiment, wiper drive devices 150 for driving wipers (not shown) are accommodated under the left and right raised parts 38a, 38b. The wiper drive device 150 is formed with a wiper motor and so on. In addition, as shown in FIGS. 14, 16 and 17, each of the left and right raised parts 38a, 38b is in a triangular pyramid shape, and has a frontward inclined part 101, a rearward inclined part 102 and the inward inclined part 103. The frontward inclined part forms an inclined surface inclining as it extends rearward. The rearward inclined part 102 extends from a rear end part of the frontward inclined part 101 to form an inclined surface declining as it extends rearward. The inward inclined part 103 extends from inner end parts of the frontward inclined part 101 and the rear inclined part 102 to form an inclined surface declining as it extends inward in the vehicle width direction.

As shown in FIGS. 14, 16, 17 and 19, each of the left and right raised parts 38a, 38b is formed with a first fragile part 103a and a second fragile part 103b at a central side in the vehicle width direction in planar view with respect to the wiper drive device 150.

Each of the fragile parts 103a, 103b functions to promote deformation caused by the impact load and, in the embodiment, is formed in the inward inclined part 103. The first fragile part 103a is a square aperture and the second fragile part 103b is a rectangular aperture extending in the right-left direction at the central side in the vehicle width direction with respect to the first fragile part 103a.

Figure 15:
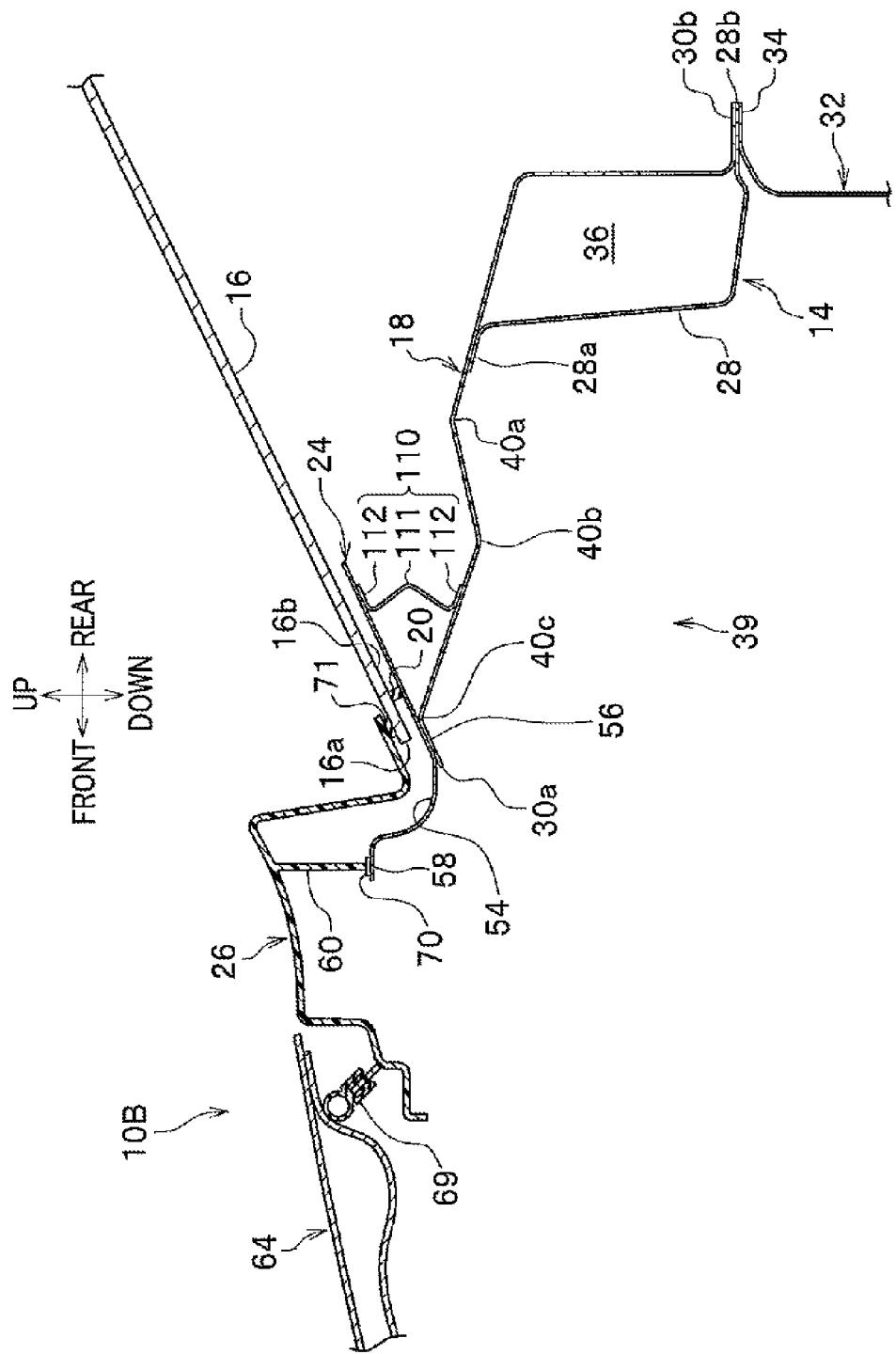
FIG. 15 is an end view taken along a XV-XV line in FIG. 14.

As shown in FIG. 15, the glass support member 24 and a central part 39 (especially, a part from the third ridgeline 40c to the second ridgeline 40b in the central part 39) of the windshield support panel 18 form a dogleg-shaped cross section (first dogleg-shaped cross section) in side view.

Figure 19:
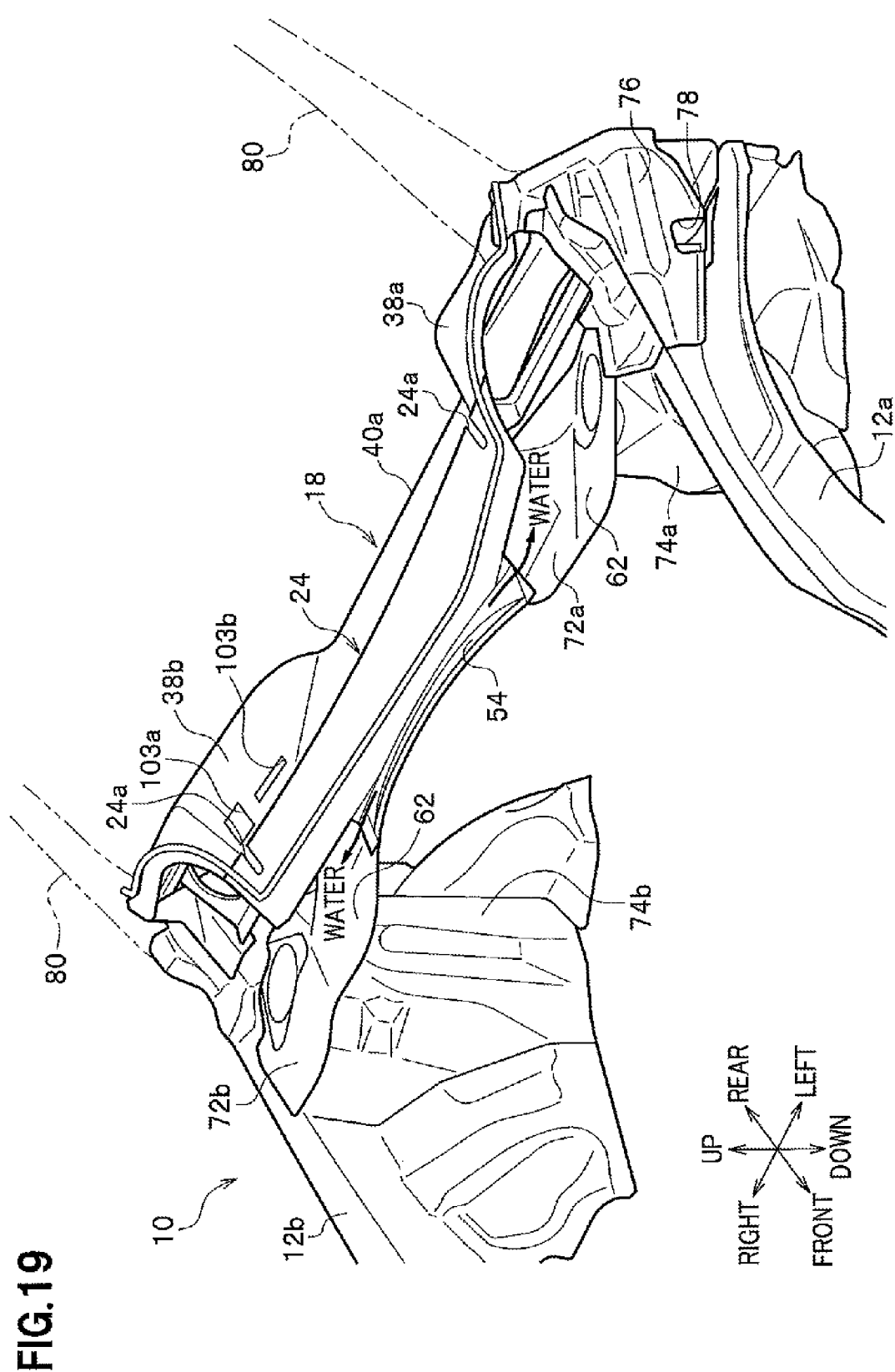
FIG. 19 is a perspective view without the cowl top.

As shown in FIGS. 14, 16 and 19, fragile parts 24a, 24a are formed at the central side in the vehicle width direction with respect to joining parts of the left and right raised parts 38a, 38b of the glass support member 24. The fragile parts 24a, 24b are intended to promote deformation caused by the impact load, are notched frontward from a rear end part of the glass support member 24, and, in the embodiment, are formed at positions overlapping with the inclined parts 103 in planar view.

Figure 20A:
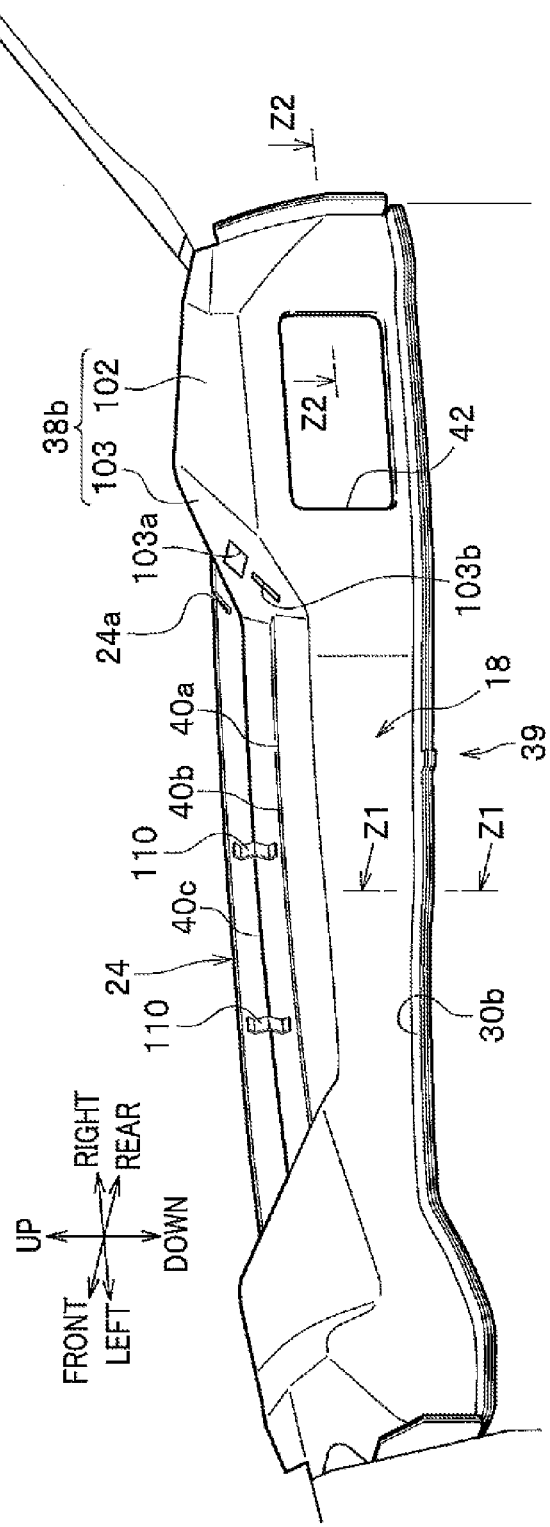
FIG. 20A is a perspective view of the windshield support panel seen from a diagonally rear side.
Figure 20B:
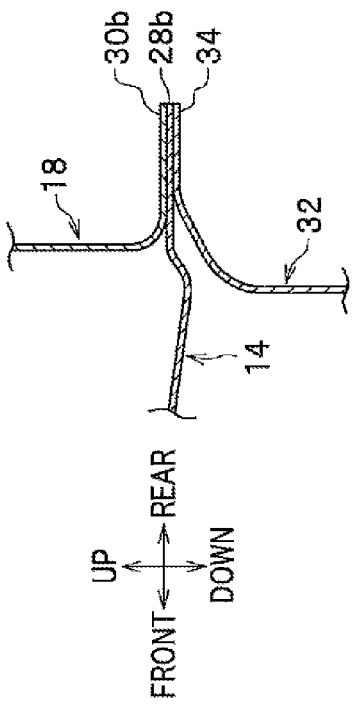
FIG. 20B is an end view taken along a Z1-Z1 line in FIG. 20A.
Figure 20C:
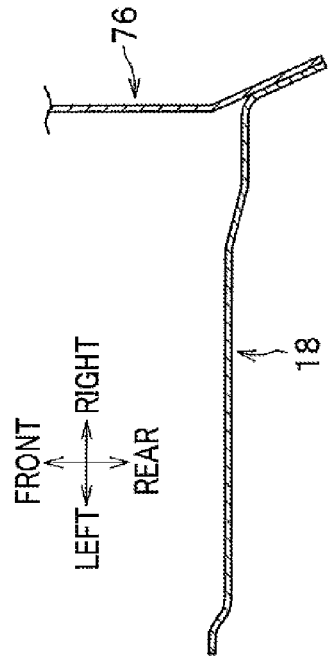
FIG. 20C is an end view taken along a Z2-Z2 line in FIG. 20A.
Figure 21:
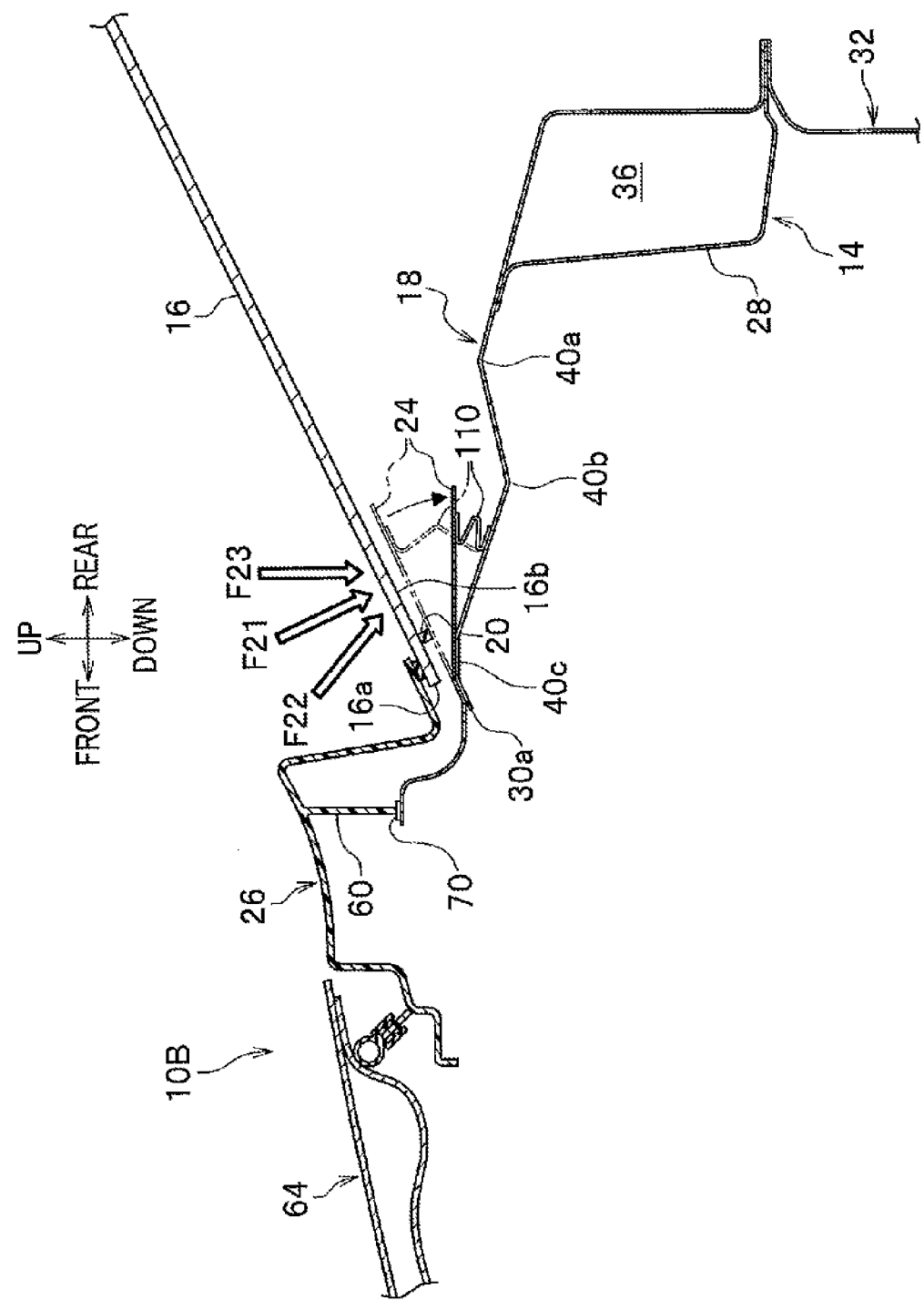
FIG. 21 is an end view taken along a XV-XV line in FIG. 14 when the external force is applied at any angle from the front in the vehicle front-rear direction.

As shown in FIGS. 15 and 20, a pair of right and left reaction force generating members 110, 110 is installed between the central part 39 and the glass support member 24. In FIG. 15 and FIG. 21 to be described later, the reaction force generating member 110 at a far side on an end surface is shown for convenience of discussion.

Each reaction force generating member 110 includes a main body part 111 that has a dogleg-shaped cross section (second dogleg-shaped cross section) in an opposite direction to the first lateral V-shaped cross section in planar view, and flange parts 112, 112 arranged at an upper and lower end parts of the main body part 111. The flange part 112 at the upper end part side is joined to the glass support member 24 and the flange part 112 at the lower end part side is joined to the central part 39 of the windshield support panel 18. The reaction force generating members 110 generate the reaction force if the glass support member 24 is deformed due to the external force.

Both end parts, in the vehicle width direction, of the joining part 56 are formed on the upper surfaces of the left and right raised parts 38a, 38b, and also, on upper surfaces of the frontward inclined parts 101 in the present embodiment. That is, the glass support member 24 is also joined on the upper surfaces of the left and right raised parts 38a, 38b. Note that the joining part 56 is joined by welding or the like. (Paragraph 49)

The vehicle 10B applied with the windshield glass support structure according to the present embodiment is basically formed as described above, and the operational effects thereof will be explained below.

Figure 24:
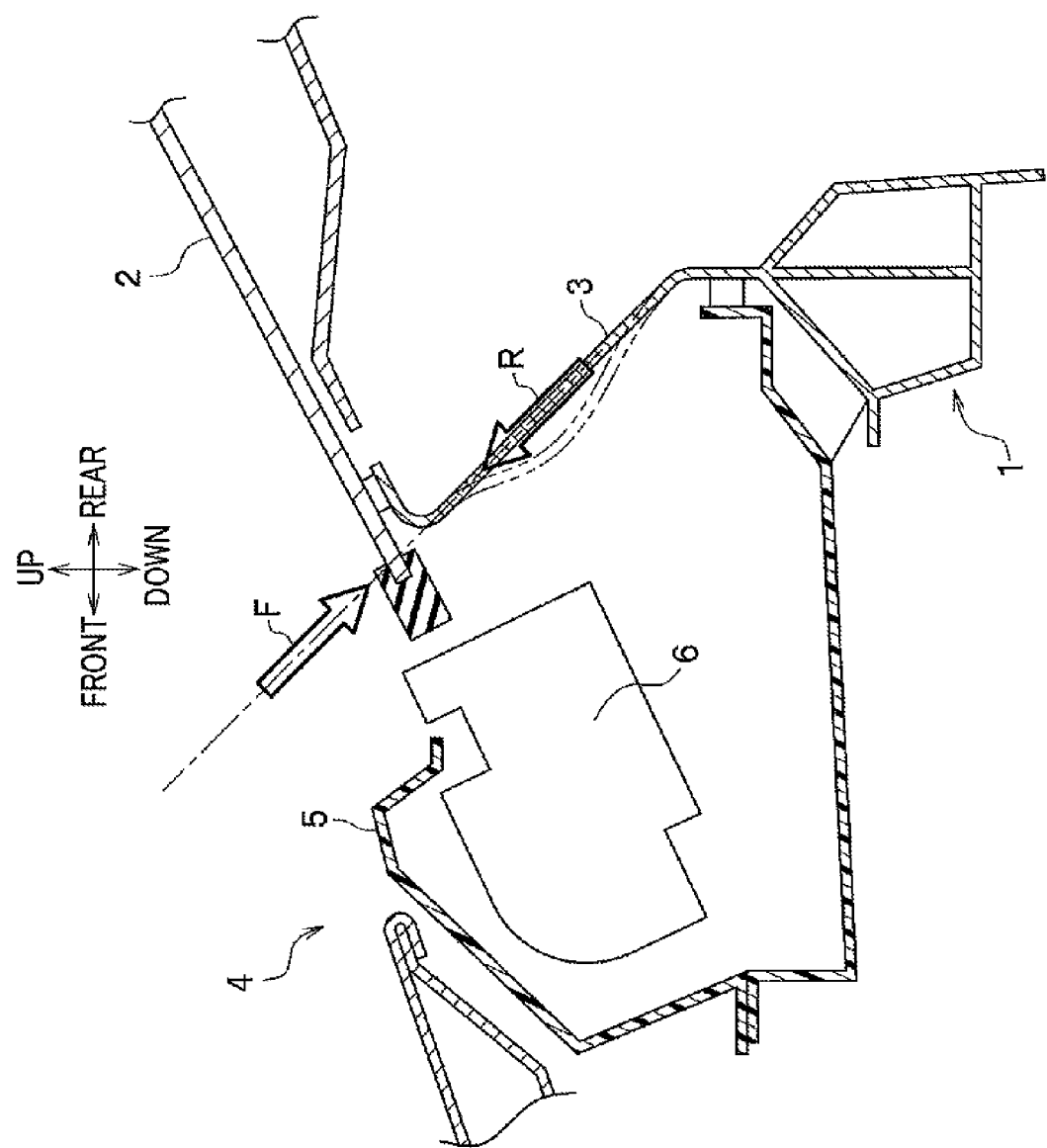
FIG. 24 is an end view of main parts in a windshield glass support structure disclosed in Patent Document 1.

In the conventional windshield glass support structure 4 shown in FIG. 24, the wiper drive devices (wiper motors) 6 for driving wipers are accommodated under the cowl upper 5. Here, if the external force F is applied to the cowl upper 5, the impact load is transmitted to the wiper drive devices 6 to cause potential large reaction force by the wiper drive devices 6.

In contrast, in the present embodiment, as shown in FIG. 21, the glass support member 24 is arranged so as to incline rearward and upward in the vehicle front-rear direction in the vehicle up-down direction from the front edge (front end flange 30a) of the windshield support panel 18 along the lower side surface 16b of the windshield glass 16. Therefore, at the central part 39 of the windshield support panel 18, for example, the glass support member 24 is deformed by external force F21, F22, F23 applied at any angle to the outer surface of the lower end part of the windshield glass 16 (FIG. 15→FIG. 21) to absorb the impact load by the external force F.

Figure 22:
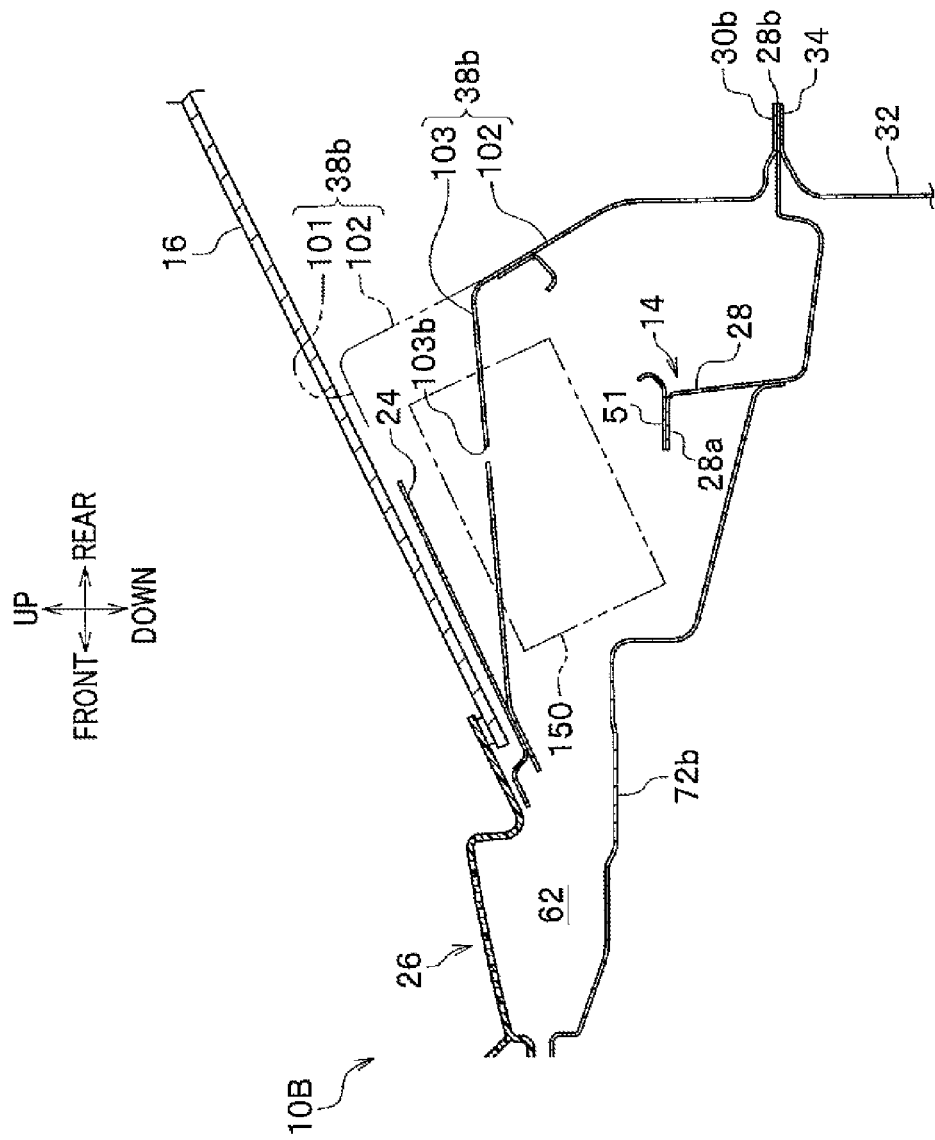
FIG. 22 is an end view taken along a XXII-XXII line in FIG. 14.
Figure 23:
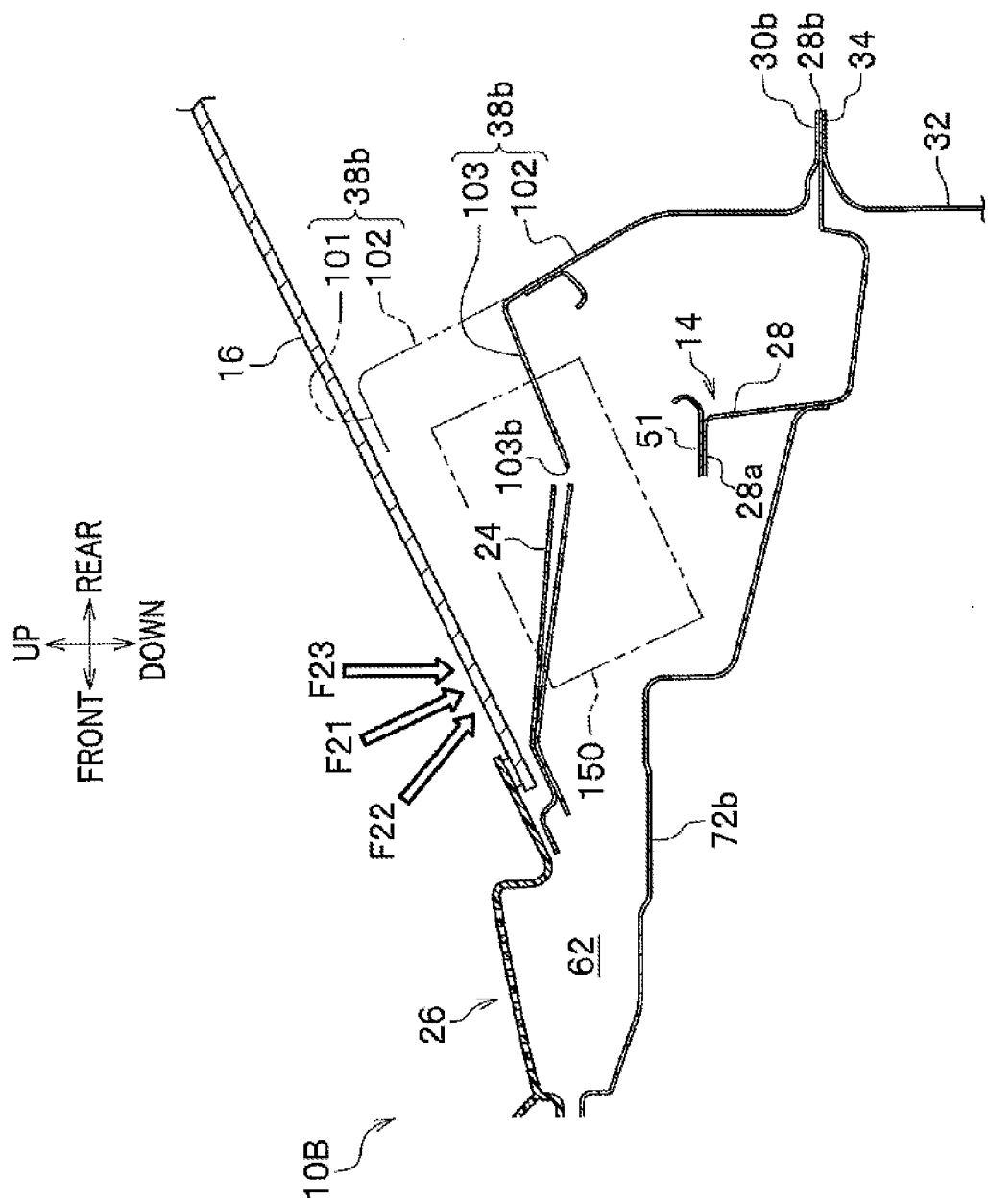
FIG. 23 is an end view taken along the XXII-XXII line in FIG. 14 when the external force is applied at any angle from the front in the vehicle front-rear direction.

Further, as shown in FIG. 14, each of the fragile parts 103a, 103b is formed at the central side in the vehicle width direction with respect to the wiper drive devices 150 in planar view of the left and right raised parts 38a, 38b. Therefore, in the left and right raised parts 38a, 38b of the windshield support panel 18, for example, even if the impact load caused by the external force F21, F22, F23 (see FIG. 21) applied at any angle to the outer surface of the lower end part of the windshield glass 16 is transmitted to the left and right raised parts 38a, 38b (especially, the inward inclined parts 103) via the glass support member 24, the glass support member 24 and the inward inclined parts 103 of the left and right raised parts 38a, 38b deform so as to avoid interference to the wiper drive devices 150 (FIG. 22→FIG. 23, only the raised part 38b side is shown) to absorb the impact load caused by the external force F. In FIGS. 22 and 23, the frontward inclined part 101, a rearward end part of the rearward inclined part 102 and the wiper drive device 150 at the far side of the end surface are shown by two-dotted lines for convenience of discussion. Here, the glass support member 24 and the inward inclined parts form a dogleg-shaped cross section bending toward the same direction as the first dogleg-shaped cross section. In addition, each of the fragile parts 103a, 103b is intended to enhance absorption performance of the impact load at the time of deformation. The first fragile part 103a prevents the impact load from being transmitted to the frontward inclined part 101 at the time of deformation. The second fragile part 103b takes the V-shape which extends in the vehicle width direction at the time of deformation.

Further, as shown in FIG. 21, the reaction force generating members 110 are arranged between the central part 39 and the glass support member 24. Therefore, the reaction force by the central part 39 can be equalized at the time of deformation with the reaction force by the left and right raised parts 38a, 38b to improve absorption performance of the impact load. Note that, in the present embodiment, the reaction force by the central part 39 and by the left and right raised parts 38a, 38b are sufficiently smaller than the reaction force R shown in FIG. 16.

Further, as shown in FIG. 14, the glass support member 24 formed with the fragile parts 24a, 24a can be easily deformed to improve absorption performance for the impact load around the left and right raised parts 38a, 38b.

Note that in FIGS. 21 and 23, the external force applied in a direction orthogonal to the axis line of the glass support member 24 is referred to as F21, the external force applied in a direction horizontally inclined from the external force F21 is referred to as F22, and the reaction force applied downward in the vertical direction is referred to as F23. However, the applying angles of the external force F applied against the outer surface of the windshield glass 16 are not limited to the angles of the external force F21 to F23.

In other words, in the present embodiment, the generation of the large reaction force R (see FIG. 24) oppositely facing the external force F to cancel out with each other can preferably be avoided. Therefore, even if the external force F is applied at any angle to the outer surface of the windshield glass 16, the impact load caused by the external force F can be preferably absorbed. Further, the reaction force by the wiper drive devices 150 can be prevented from being generated against the impact load transmitted to the wiper drive devices 150.

Especially, if the external force F is applied to the outer surface at the lower end part of the windshield glass 16 from above the central part 39 of the windshield support panel 18 and from above the inward inclined parts 103 of the left and right raised parts 38a, 38b, the glass support member 24 and the inward inclined parts 103 of the windshield support panel 18 positively deform to absorb the impact load. Further, the front inclined parts 101 of the windshield support panel 18 are suppressed from being deformed to prevent the reaction force from being generated by the wiper drive devices 150 against the impact load transmitted to the wiper drive devices 150.

DESCRIPTION OF REFERENCE NUMERALS 10 vehicle
14 cross member
16 windshield glass
16a lower side surface
18 windshield support panel
24 glass support member
24a fragile part
26 cowl top
38a, 38b raised part
40a to 40c ridgeline
46a, 46b reinforcement panel
54 drain
56 joining part
60 partition wall
62 intake passage
68 cowl raised part
72a, 72b damper base support
103a, 103b fragile part
110 reaction force generating member
150 wiper drive device

The invention claimed is:

1. A windshield glass support structure comprising:
a windshield support panel that extends from a cross member toward a lower end of a windshield glass; and
a glass support member that inclines rearward in a vehicle front-rear direction and upward in a vehicle up-down direction from a front edge of the windshield support panel along a lower side surface of the windshield glass, wherein
the glass support member is arranged to be deformable when external force is applied to an outer surface of the windshield glass, and
the glass support member includes a drain that extends from a joining part with the windshield support panel toward a front of the vehicle.

2. The windshield glass support structure according to claim 1, wherein
a cowl top is arranged in front of the windshield glass in the vehicle front-rear direction, and
a front edge at a front side of the drain in the vehicle front-rear direction is closed by a partitioned wall of the cowl top.

3. The windshield glass support structure according to claim 2, wherein
both end parts of the drain in the vehicle width direction are connected to intake passages arranged at a right and left sides of the vehicle.

4. The windshield glass support structure according to claim 3, wherein
the cowl top has a cowl raised part,
damper base supports that form the intake passages are arranged on both end sides of the cowl raised part in the vehicle width direction, respectively, and
the cowl top is supported by the damper base supports.

5. The windshield glass support structure according to claim 3, wherein
the intake passages extend such that a height size of the intake passages in an vehicle up-down direction decreases frontward in the vehicle front-rear direction, and
the intake passages are formed by the raised parts of the windshield support panel and the damper base support that extend frontward in the vehicle front-rear direction from the cross member and are arranged in the vehicle up-down direction, and the cowl top that is installed between the damper base supports and the windshield support panel.

6. The windshield glass support structure according to claim 1, wherein raised parts are arranged at both end parts of the windshield support panel in the vehicle width direction, respectively, and a reinforcement panel that continues to an upper wall of the cross member is arranged on the raised part of the windshield support panel.

7. A windshield glass support structure comprising:

a windshield support panel that extends from a cross member toward a lower end of a windshield glass; and a glass support member that inclines rearward in the vehicle front-rear direction and upward in a vehicle up-down direction from a front edge of the windshield support panel along a lower side surface of the windshield glass, wherein the glass support member is arranged to be deformable when external force is applied to an outer surface of the windshield glass, the windshield support panel includes a central part and a pair of right and left raised parts that extend from both end parts of the central part in the vehicle width direction, a lower end part of the windshield glass is supported by the pair of right and left raised parts and the glass support member, the central part and the glass support member forms a first dogleg-shaped cross section in side view, wiper drive devices are accommodated under the raised parts, and a fragile part is formed on a central side in the vehicle width direction with respect to the wiper drive devices in planar view of the raised parts.

8. The windshield glass support structure according to claim 7, wherein a reaction force generating member is included between the central part and the glass support member, and the reaction force generating member forms a second dogleg-shaped cross section in an opposite direction as the first dogleg-shaped cross section.

9. The windshield glass support structure according to claim 7, wherein the glass support member is joined on upper surfaces of the pair of right and left raised parts.

10. The windshield glass support structure according to claim 9, wherein a fragile part is formed on the central side in the vehicle width direction with respect to a joining part with the raised part of the glass support member.

11. The windshield glass support structure according to claim 9, wherein the glass support member includes a drain that extends from the joining part with the raised part frontward in the vehicle front-rear direction.

12. The windshield glass support structure according to claim 11, wherein a cowl top is arranged in front of the windshield glass in the vehicle front-rear direction, and a front edge at the front side of the drain in the vehicle front-rear direction is closed by a partitioned wall of the cowl top.

13. The windshield glass support structure according to claim 7, wherein a plurality of ridgelines extending in the vehicle width direction are formed in the central part of the windshield support panel.

* * * * *